United States Patent
Bhunia et al.

(10) Patent No.: US 11,314,953 B2
(45) Date of Patent: Apr. 26, 2022

(54) TAGGING OF MATERIALS AND OBJECTS AND ANALYSIS FOR AUTHENTICATION THEREOF

(71) Applicants: CASE WESTERN RESERVE UNIVERSITY, Cleveland, OH (US); UNIVERSITY OF FLORIDA RESEARCH FOUNDATION, INC., Gainesville, FL (US)

(72) Inventors: Swarup Bhunia, Gainesville, FL (US); Naren Vikram Masna, Gainesville, FL (US); Soumyajit Mandal, Shaker Heights, OH (US)

(73) Assignees: CASE WESTERN RESERVE UNIVERSITY, Cleveland, OH (US); UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 16/817,282

(22) Filed: Mar. 12, 2020

(65) Prior Publication Data
US 2020/0293730 A1    Sep. 17, 2020

Related U.S. Application Data

(60) Provisional application No. 62/817,473, filed on Mar. 12, 2019.

(51) Int. Cl.
G06K 17/00    (2006.01)
G06K 7/10     (2006.01)

(52) U.S. Cl.
CPC ................. *G06K 7/10366* (2013.01)

(58) Field of Classification Search
CPC ............ G06Q 10/087; G06Q 10/0833; G06Q 10/083; G06Q 10/0832; G06Q 10/08;
(Continued)

(56) References Cited

U.S. PATENT DOCUMENTS

2013/0207783 A1* 8/2013 Cruzado ............... G06K 19/07 340/10.5

OTHER PUBLICATIONS

Bhunia, S., & Mandal, S. "Countering counterfeit drugs: A technique used for detecting explosives can also verify the integrity of medicines". IEEE Spectrum, 56(09), 38-43 pp. (Sep. 2019).
(Continued)

*Primary Examiner* — Jamara A Franklin
(74) *Attorney, Agent, or Firm* — Tarolli, Sundheim, Covell & Tummino LLP

(57) ABSTRACT

This disclosure relates to tagging of materials and objects and analysis for authentication thereof. An example method includes analyzing separately a number of locations distributed across a given surface of a solid object according to one or more analysis technologies to determine feature data for each of the locations. The feature data are indicative of a respective chemical property and/or mechanical property of the solid object at each of the locations, corresponding to a feature tag, and the feature data depend on the one or more analysis technologies. The method also includes determining a tag signature for the solid object based on the feature data determined for each of the locations.

21 Claims, 16 Drawing Sheets

(58) Field of Classification Search
CPC ... G06Q 50/28; G06Q 30/0269; H04W 4/029;
H04W 4/80; H04W 4/38; H04W 4/02;
H04W 12/06; B65D 2203/10; G06K
7/10366; G06K 19/0717; G06K 7/10297;
G06K 19/07758; G06K 7/10821; G06K
7/1413; G05B 2219/23363; H04B 10/25;
H04B 10/541; H04B 10/672; H04B 10/69

USPC ....... 235/375, 385; 705/14.66, 28, 308, 333;
340/539.1, 539.26, 568.1, 572.1, 572.7,
340/572.8
See application file for complete search history.

(56) References Cited

OTHER PUBLICATIONS

Masna, Naren Vikram Raj, et al. "Eat, but Verify: Low-Cost Portable Devices for Food Safety Analysis." IEEE Consumer Electronics Magazine 8.1 (Dec. 2018): 12-18 pp.
Masna, Naren Vikram Raj, et al. "Authentication of dietary supplements through Nuclear Quadrupole Resonance (NQR) spectroscopy." International Journal of Food Science & Technology 53.12 (Jul. 2018): 2796-2809 pp.
Chen, Cheng, et al. "Broadband quantitative NQR for authentication of vitamins and dietary supplements." Journal of Magnetic Resonance 278 (May 2017): 67-79 pp.
Ariando, David, et al. "An autonomous, highly portable NMR spectrometer based on a low-cost System-on-Chip (SoC)." Journal of Magnetic Resonance 299 ( Feb. 2019): 74-92 pp.
Glickstein, Jarred, and Soumyajit Mandal. "An automated instrument for polarization-enhanced broadband nuclear quadrupole resonance (NQR) spectroscopy." Review of Scientific Instruments 89.9 (Sep. 2018): 093106.

\* cited by examiner

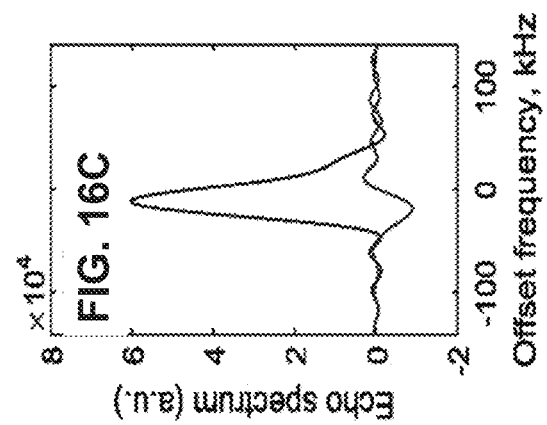
FIG. 16C
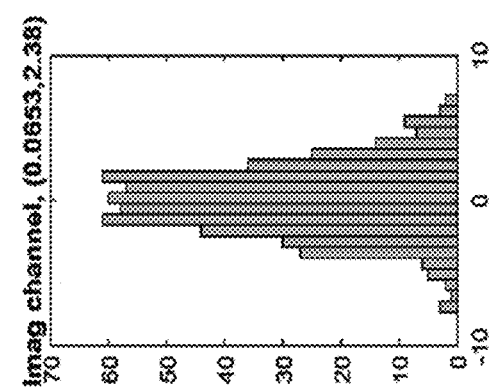
FIG. 16F
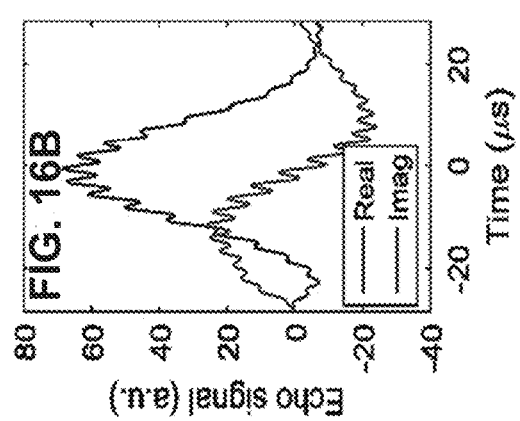
FIG. 16B
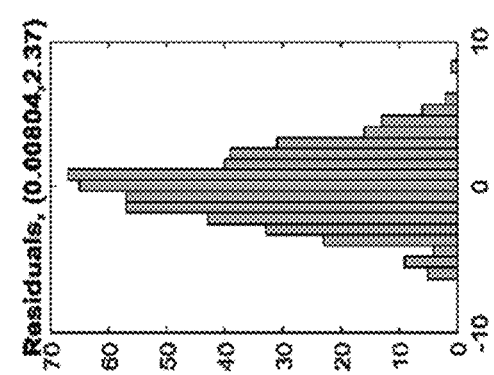
FIG. 16E
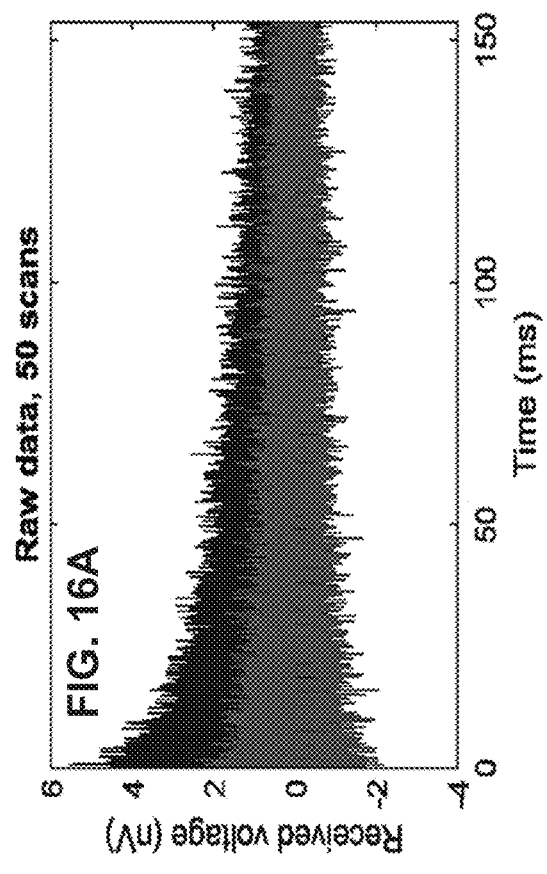
FIG. 16A
FIG. 16D
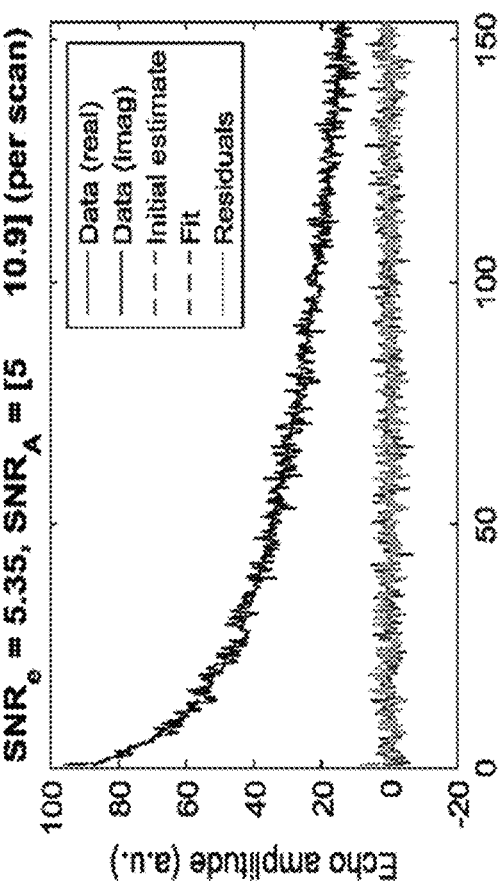

TAGGING OF MATERIALS AND OBJECTS AND ANALYSIS FOR AUTHENTICATION THEREOF

CROSS-REFERENCE TO RELATED APPLICATION

This application claims priority from U.S. provisional application No. 62/817,473, filed Mar. 12, 2019, and entitled CHEMICAL TAGGING OF MATERIALS AND OBJECTS AND SPECTROSCOPIC ANALYSIS FOR AUTHENTICATION THEREOF, which is incorporated herein by reference in its entirety.

GOVERNMENT FUNDING

This invention was made with government support under Grant Nos. SHF-1563688 and SHF-1563924 awarded by the National Science Foundation. The United States government has certain rights to the invention.

TECHNICAL FIELD

This disclosure relates to tagging of materials and objects and analysis for authentication thereof.

BACKGROUND

The authenticity and safety of everyday materials (e.g., foods, drugs and other consumable as well as non-consumable products) can be subject to questions with little or no way to verify their authenticity. For example, radio frequency identifiers (RFID) and barcodes are two common technology methods that are applied to packaging and used to implement tracking and/or traceability with respect to the item or its packaging. These and other existing tracking and/or tracing methods are vulnerable to tampering and counterfeiting. In many industries, counterfeiting of products is a substantial problem that significantly impacts not only the revenues of original product manufacturers, but may even pose a serious threat to health and even life of consumers or operators of counterfeited, i.e., fake, products. Such safety relevant product categories include, in particular, parts for automobiles and aircraft, components for the construction of buildings or other infrastructure, food, and even medical devices and pharmaceuticals.

In order to limit counterfeiting and address in particular such safety concerns, the industry has developed a number of different protection measures. Broadly used protection measures comprise adding a so-called security feature to a product, the feature being rather difficult to fake. For example, holograms, optically variable inks, security threads and embedded magnetic particles are known security features which are difficult to reproduce by counterfeiters. While some of these security features are "overt", i.e., can be easily seen or otherwise recognized by a user of the product, other security features are "covert", i.e., they are hidden and can only be detected by using specific devices, such as sources of UV-light, spectrometers, microscopes or magnetic field detectors, or even more sophisticated forensic equipment. Examples of covert security features are in particular printings with luminescent ink or ink that is only visible in the infrared part of the electromagnetic spectrum but not in its visible part, specific material compositions and magnetic pigments.

SUMMARY

A method may include analyzing separately a number of locations distributed across a given surface of a solid object according to one or more analysis technologies to determine feature data for each of the locations. The feature data are indicative of a respective chemical property and/or mechanical property of the solid object at each of the locations, corresponding to a feature tag, and the feature data depend on the one or more analysis technologies. The method also includes determining a tag signature for the solid object based on the feature data determined for each of the locations.

As another example, a system to authenticate an object is provided. The system includes a measurement subsystem to measure features from a number of spatial locations distributed across a given surface of a solid object and to generate corresponding feature data representing the measured features for each of the locations. The feature data for each respective location depends on respective chemical and/or mechanical properties at each of the locations. One or more non-transitory machine-readable media is configured to store the feature data and machine-readable instructions executable by a processor to perform a method. The method includes determining a signature for the object based on the feature data determined for at least some of the spatial locations and storing the signature for the object.

BRIEF DESCRIPTION OF THE DRAWINGS

FIGS. 16A-16F depict examples of different types of iNQR measurement results.

DETAILED DESCRIPTION

This disclosure provides systems and methods for intrinsic tagging of materials and objects and spectroscopic analysis for authentication of such objects and materials.

As an example, material biometrics generates random, unique signatures and watermarks for any products using intrinsic and/or extrinsic tagging. The tagging can be implemented by applying chemical tags, corresponding to watermarks and random signatures, to solid objects. For example, characteristics of this tag include being invisible to the naked eye, providing a complex signature variable, being unclonable, and being economical.

In some examples, the tag may be exposed on the surface of the object or it may be covered with a coating or layer of another material. The spatial locations where chemicals are applied and the particular type and quantity of chemicals and/or mechanical property is changed at each locations encodes a watermark or signature that can be accessed or determined by analysis using predetermined one or more respective technologies. As used herein, the spatial locations may be a set of two- or three-dimensional regions across the surface that may be contiguous regions or may be spaced apart from each other on the surface in a distributed deterministic manner. Examples of some spectroscopic forms of analysis include nuclear quadrupole resonance (NQR), nuclear magnetic resonance (NMR), near-infrared (NIR) spectroscopy, and ultrasound; though, the systems and methods disclosed herein are not limited to any one or more type of analysis technology. For instances of increased security, a bi-modal or multi-modal system of authentication employing two or more of technologies can be used as an authentication process. Even if the counterfeiter knows which technology to use, it is difficult to realize the chemical used for tagging and its quantity or concentration, such that the tag may be considered unclonable.

Figure 1:
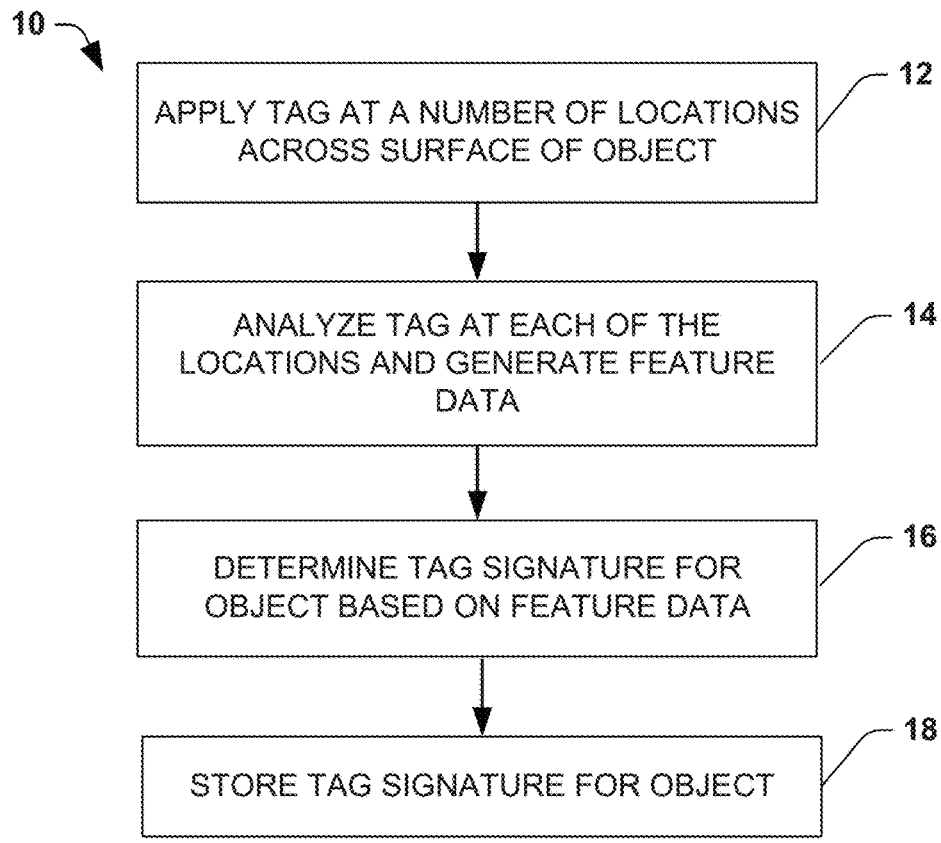
FIG. 1 is a flow diagram depicting an example method of tagging an object.

FIG. 1 depicts an example method 10 for tagging an object, such as to enable subsequent authentication of the object by one or more analysis technologies. The method begins at 12 by applying a tag at a number of locations distributed across a surface of a solid object. The tag may be applied by modifying a chemical property, a physical property or both chemical and mechanical (e.g., physical) properties of the object. The number of locations (e.g., 2, 4, 8 or more) can be set according to the desired complexity of a signature that is to be generated. For example, each chemical tag includes a respective quantity and concentration of one or more chemical elements applied at each of the locations. As used herein, a chemical element may refer to any single chemical element or a chemical compound that includes of two or more chemical elements in defined proportions and in chemical combination. For example, two or more chemical elements may be mixed together and combined through a chemical reaction to form a new substance, corresponding to the chemical tag, which has corresponding properties or characteristics. One example of a chemical element is sodium chlorate ($NaClO_3$).

In some examples, the chemical tag is embedded within a substrate material or coating adjacent to the given surface of the object. In other examples, the tag is on the surface of the object itself, which may be exposed or covered by a coating of another material. As an example, the tag can be used for different materials, including consumable and non-consumable materials. Examples of consumables include pharmaceuticals, food, supplements, beverages, and drinks. Examples of non-consumables include plastics, glass, metals, and synthetic materials. Thus, object to which the tag is applied may be a container or packaging material that contains a quantity of the consumable material or it may be applied directly to non-consumable material.

As a further example, the chemical tag includes different concentrations of the one or more chemical elements applied to different spatial locations on the object. The chemical tag may include a deterministic concentration of a given chemical element for each of the different spatial locations to which a tag is applied. In an example, the concentration of the given chemical element is different for one or more of the different spatial locations.

At 14, the method includes analyzing (e.g., by an analysis system) the chemical tag at each of the locations according to one or more analysis technologies to determine feature data for each tag. The feature data provided by the analysis system may be indicative of a respective composition and/or concentration of one or more chemical elements applied to the solid object at each of the locations, corresponding to the chemical tag. For example, the feature data that depends on the composition and concentration of the one or more chemical elements at each of the locations. The value of the feature data for each of the spatial locations further can be proportional (or otherwise functionally related) to the concentration of the given chemical element at each respective location.

The resulting feature data further may depend on the one or more analysis technologies used at 14. For the example of NQR, examples of feature data may include one or more (e.g., at least two) of amplitude of the spectrum, decay-time, and linewidth (see, e.g., FIG. 3). Other examples of analysis technology include nuclear magnetic resonance (NMR), near-infrared (NIR) spectroscopy, and ultrasound. In some examples, since NQR is known as "zero-field NMR, the NQR analysis function may be implemented by common hardware that is used for implementing NMR without applying a magnetic field to generate nuclear energy levels. This enables the system to be implemented in a smaller form factor, thus affording greater portability and even implementation in a handheld device. In other examples, NMR and NQR may be implemented by separate dedicated hardware. Each of these and other analysis technologies may be used separately or in any combination thereof to provide corresponding feature data for each tag location. In an example when multiple analysis technologies are used to analyze tags, a corresponding feature data set for each respective tag can be provided based on an aggregate of feature values determined by the respective analysis technologies, which may be applied independently at different locations where the tag is applied.

For example, the analysis at 14 may include applying a magnetic field gradient at a selected resonance frequency to determine the spectroscopic feature data for one or more of the tag locations (e.g., each tag location). The selected resonance frequency may be set to a respective range of frequencies for each of the respective locations, which may depend on the chemical element at each location.

By way of example, one or more analysis technologies are configured to analyze separately a number of locations distributed across a given surface of the solid object to determine spectroscopic feature data for each of the locations. To analyze the different locations, a control system can be configured to control an actuator (e.g., a motor) that moves the object to align the tag locations with a field of field of view of the analysis technology (e.g., one or more spectrometry devices). Alternatively or additionally, the actuator may move the analysis technology relative to the object. In either case, such movement may be one-dimensional spatial movement, two-dimensional movement, or three-dimensional movement. In yet another example, a user may manually position a device, which is configured to implement one or more of the analysis technologies, or position the object relative to a scanning window of the device to enable scanning and analysis at each of the locations. Such manual positioning would operate much the same way that a barcode scanner works.

At 16, the method includes determining a tag signature for the object based on the feature data determined for each of the tag locations. For example, the feature data can be scaled and normalized for a given analysis technology, and the scaled and normalized values for each tag location can be combined in a predetermined manner to provide the signature. The tag signature thus may include a set of values, each of which values is determined based on the corresponding feature data determined according to a selected analysis technology for a respective one of the locations.

At 18, the method includes storing object data in a data repository (e.g., in a computing cloud or other database that is accessible via a network connection (e.g., an internet connection). The object data can include the tag signature (from 16) for the solid object as well as other data identifying the solid object. For example, the data identifying the object (e.g., model identifier, serial number product name or the like) may be used as an index to a database to look up the signature as part of an authentication method (e.g., see FIG. 2). Because each signature can be unique, the signature itself, which is generated, may be used to search the database for purposes of authentication.

Figure 2:
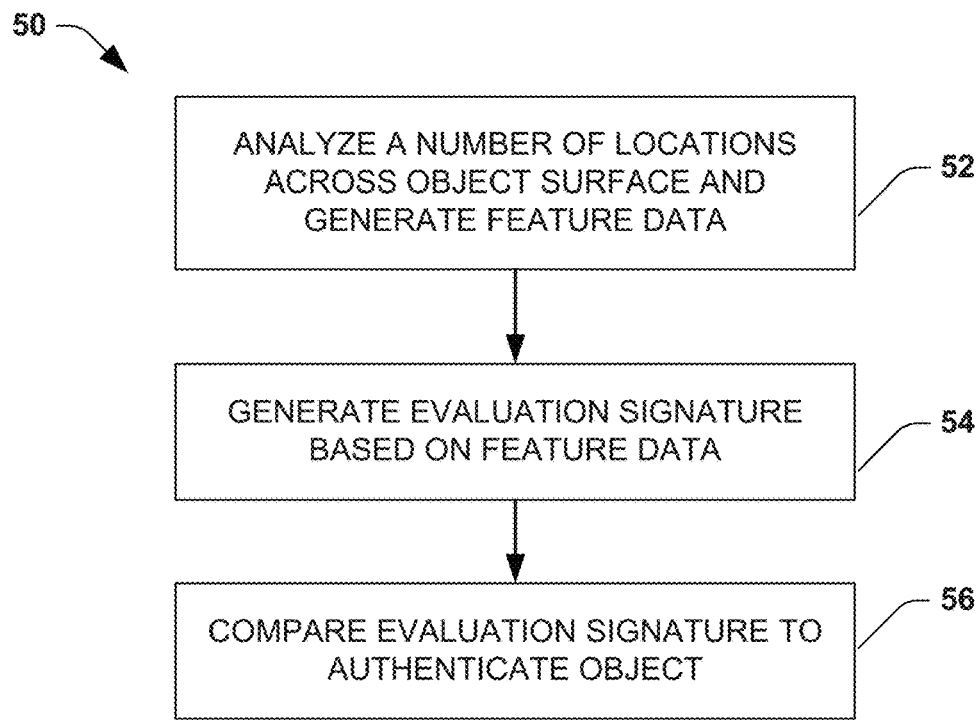
FIG. 2 is a flow diagram depicting an example method of authenticating an object.

FIG. 2 is a flow diagram depicting an example method 50 that can be used for authenticating an object, such as described herein (e.g., a consumable or non-consumable product). At 52, the method 50 includes analyzing a number of locations distributed across a given surface of a solid object according to one or more analysis technologies (e.g., NMR spectrometry, NQR spectrometry, NIR spectrometry and/or ultrasound) to determine corresponding feature data for each of the locations. The feature data further can vary depending on the particular analysis (e.g., spectrometry) technology used to produce the feature data and associated post-acquisition processing thereof. As mentioned above, the feature data for each respective location depends on a composition and concentration of one or more chemical elements at each of the locations. The chemical elements may be part of extrinsic tag applied to a given location (e.g., on or embedded within a surface of the object) and/or be an intrinsic tag according to the construction and materials of the object itself. In addition to or as an alternative to chemical elements used as tags, the physical structure of the object may be modified to form a mechanical tag (e.g., mesoscopic texture changes), which may be analyzed by ultrasound device to provide corresponding ultrasound feature data.

At 54, the method includes generating an evaluation signature based on the corresponding feature data. For example, the evaluation signature is provided by aggregating values representing feature data that is generated for a combination of tag locations in a prescribed sequence. The sequence of data may be known in advance or provided (e.g., over a secure data connection, such as through wireless connection) to the signature generating device (e.g., computer) at the time when the signature is being created. As an example, the order or sequence in which the feature data is concatenated to form the signature may be established in advance by the manufacturer or other entity in the supply chain. As a further example, the order and/or locations to be used for generating the signature may be communicated to the analysis system (e.g., through a wireless data link, such WiFi or cellular) just prior or during the authentication process. The resulting evaluation signature may be stored in memory (e.g., local memory and/or remote memory).

At 56, the evaluation signature is compared with a stored tag signature to authenticate the solid object if the evaluation signature matches the stored tag signature for the solid object. Alternatively, the solid object may be identified as being counterfeit if the evaluation signature fails to match the stored tag signature for the solid object within expected limits. The results of the authentication further may be stored in memory and/or used to send a message to a back office system for tracking purposes. For example, the results may be used adjust or modify one or more authentication models for subsequent signature generation and comparison. In some examples, the analysis is performed by a device that includes electronics within a common portable housing. A computing device is programmed to generate the signature based on the feature data, which computing device may be within the common portable housing or be connected to the housing via an interface (e.g., through a physical and/or wireless connection).

Figure 3:
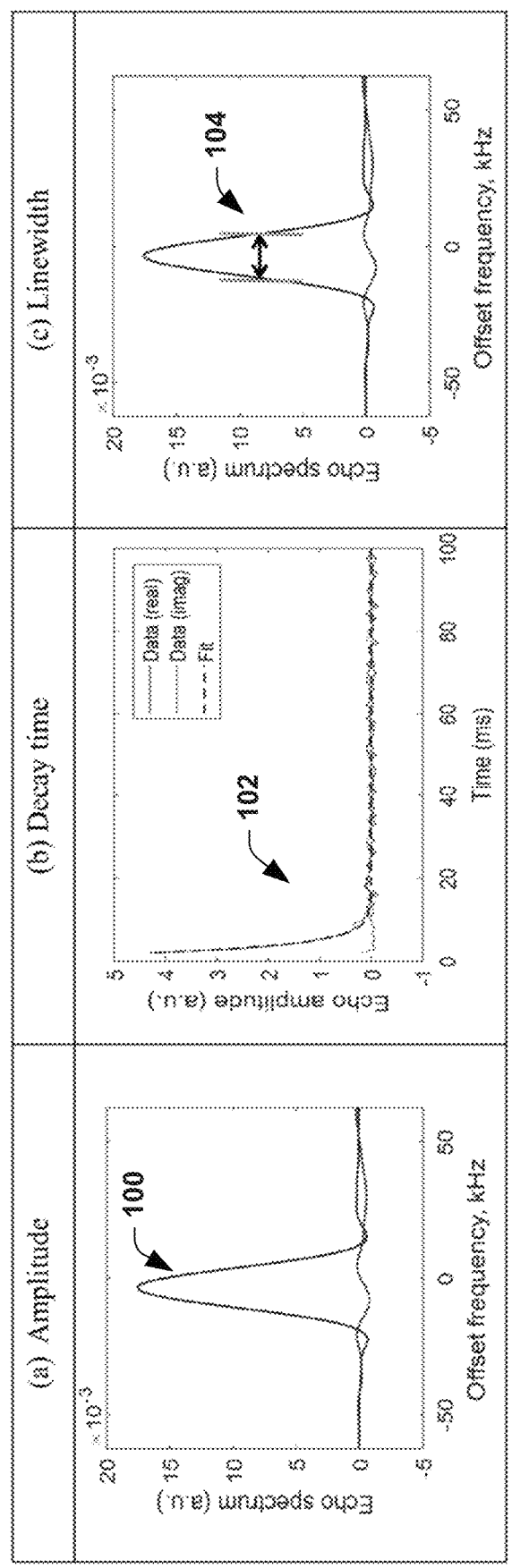
FIG. 3 depict plots of example features generated from spectroscopic analysis of an object.

FIG. 3 depict plots 100, 102 and 104 showing example features generated from spectroscopic analysis of an object. In the example of FIG. 3, the plots are from NQR measurements of a given tag location. Similar types of features for chemical tags may be generated using other analysis technologies (e.g., NMR, NIR and/or ultrasound) for use in implementing the system and methods disclosed herein. The plot 100 depicts an amplitude of a spectrum at a resonance frequency. The plot 102 depicts decay time for real and imaginary data. The plot 104 demonstrates linewidth of a spectrum (e.g., the same as plot 100). Thus, one or more of the features from the plots 100, 102 and 104 may be used to provide corresponding feature data for the given tag location. Statistical analysis of this or other spectrometric information may be used, additionally or alternatively.

Figure 4:
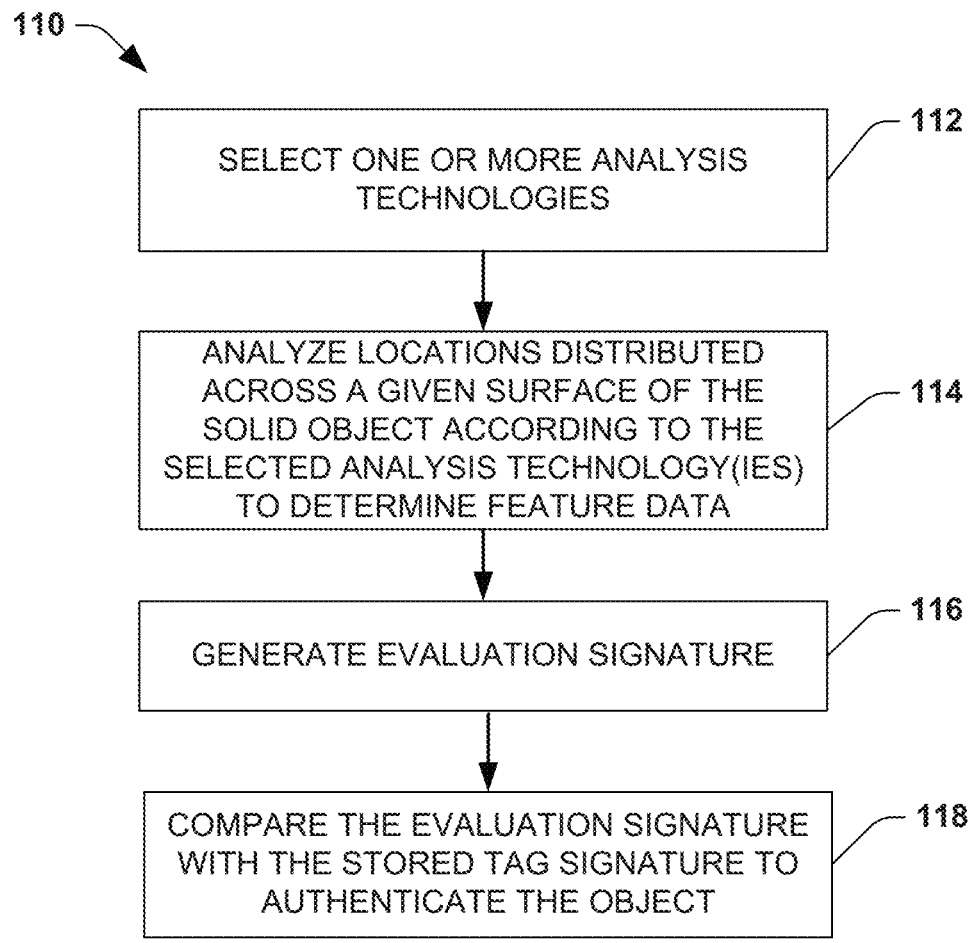
FIG. 4 is a flow diagram depicting another example method of authenticating an object.

FIG. 4 is a flow diagram depicting an example of another authentication process 110 that may be implemented. The process 110 may be implemented by a system, device or apparatus configured to perform the process or at least a portion thereof. For example, a handheld or other portable device includes hardware and software configured to analyze locations across the object according to one or more analysis technologies. The device may also include non-transitory memory storing data and instructions. One or more processors thus can access the data and instructions programmed to control the devices and to determine, analyze and evaluate feature data generated according to each analysis technology that is implemented.

At 112, the process 110 includes selecting which of the one or more analysis technologies to utilize as part of the authentication process. For example, the analysis technologies include one or more of NMR spectrometry, NIR spectrometry, NQR spectrometry and ultrasound. Additional or alternative types of analysis technologies may also be used in other examples. As mentioned, each of the analysis technologies that are available may be integrated in a common handheld or portable housing.

At 114, the process includes analyzing the number of locations distributed across a given surface of the solid object according to the one or more analysis technologies (selected at 112) to determine corresponding feature data for each of the locations. The feature data may be stored in the memory (e.g., a memory device implemented in the handheld device or portable housing and/or be communicated to a remote memory). The feature data further may be indicative of a respective chemical property and/or mechanical property that depends on which of the analysis technologies generates the respective feature data. For the example of MR, NIR or NQR, the feature data includes spectroscopic feature data representing a composition and/or concentration of one or more chemical elements of the solid object at least one of the respective locations, such as one or more of spectrum amplitude, decay time and linewidth. For the example of ultrasound, the feature data represents a physical property of the object, such as including mesoscopic texture of the object of the solid object one or more locations across the object. For example, an attenuation coefficient or other parameter(s) can be computed for the ultrasound signal, based on evaluating the transmit and receive ultrasound signals. The attenuation coefficient varies as a function of ultrasonic frequency and depends on the composition and physical properties of the object 202 under test. The attenuation coefficient and other ultrasound parameters may be stored as the ultrasound feature data 248

One or more feature values (e.g., an array of values) may be determined from the feature data provided by each selected analysis technology that is applied at each of the respective locations. Each feature value for each respective location further may be a normalized value (mapped to a predefined scale) or an absolute value for each item of feature data (e.g., spectroscopic or other feature data) that is measured. The feature values that are stored in memory thus may be analog or digital values representative of chemical and/or physical properties of the object at each of the respective locations that are analyzed.

At 116, the process includes generating an evaluation signature based on the corresponding feature data. For example, the evaluation signature may be derived from the feature values determined for each of the locations, such as by combining the feature values determined for each of the respective locations. The ordering of feature values and/or respective locations into the signature may be predetermined (e.g., set to match the order used to generate the tag signature) as to provide a further mechanism to increase security of the authentication process. For example, the manufacturer of a product or another entity within the supply chain may defined the ordering for a given object. The evaluation signature may be stored in memory (e.g., of the handheld and/or portable device) and/or be communicated to a remote system for data logging purposes and/or further processing.

At 118, the process includes comparing the evaluation signature with the stored tag signature to authenticate the solid object. The stored tag signature may be stored in local memory (e.g., of the handheld and/or portable device) and/or in a remote system, which may depend on where the comparison at 118 is to be implemented. The comparison at 118 includes determining that the solid object is authentic if the evaluation signature matches the stored tag signature. The comparison at 118 further can identify the solid object as counterfeit if the evaluation signature fails to match the stored tag signature for the solid object. The stored tag signature may be uniquely generated for each specific object, a common tag signature may be for provide for multiple (e.g., a set or lot of) objects or be common for all solid objects that may be produced. In an example, the signature may encode a serial number or other identifier unique to the object or set of objects.

Figure 5:
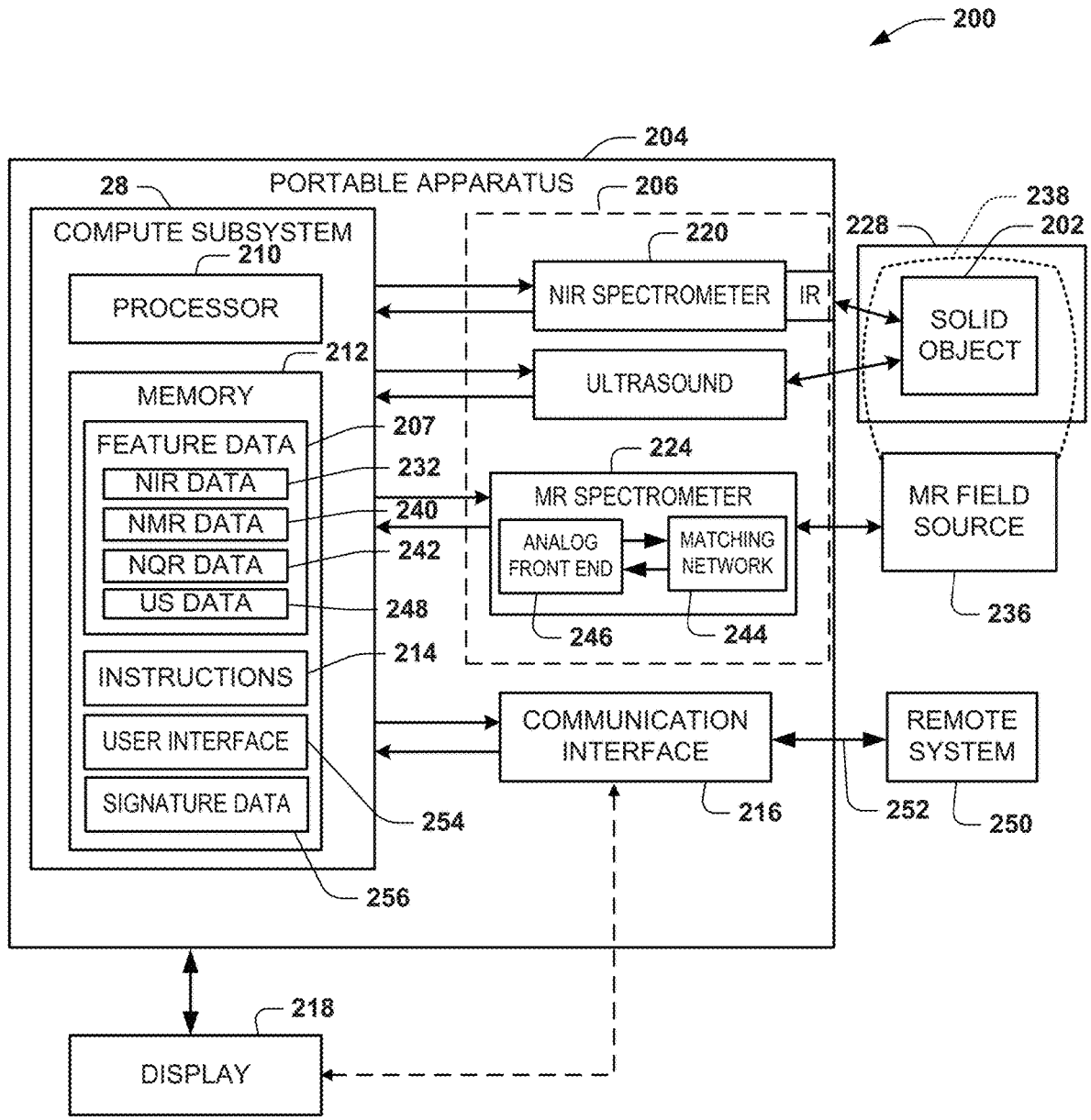
FIG. 5 depicts an example of a system that can be used to analyze and authenticate tags applied to an object.

FIG. 5 depicts an example of a system 200 that is configured for authentication of objects 202 (e.g., according to the method of FIGS. 2 and/or 4). The system also may be used to generate tag signatures for various objects (e.g., according to the method of FIG. 1). As disclosed herein, the system 200 may be implemented as a handheld or otherwise portable apparatus capable of being carried without undue effort by a human user.

The system 200 includes a measurement subsystem 206 configured to implement one or more analysis technologies to measure features from a number of spatial locations distributed across a given surface of a solid object. The measurement subsystem 206 thus may include circuitry and associated hardware as well as program instructions to implement each of the analysis technologies. The measurement subsystem 206 is further configured to generate corresponding feature data 207 representing the measured features for each of the locations, the feature data for each respective location on the surface of the object depending on respective chemical and/or mechanical properties at each of the locations.

The system 200 also includes a computing subsystem 208 that may include a processor 210 and memory 212 embodied as one or more non-transitory machine-readable media. The memory 212 may to store the feature data and machine-readable instructions (e.g., code) 214 executable by the processor 210 to perform the various methods disclosed herein (e.g., see FIGS. 1, 2 and 4). The computing subsystem 208 may be integrated in a common housing of the portable apparatus 204 along with the measurement system 206 and other electronics. Such other electronics may include a communications interface 216 and a display 218. In some examples, the display 218 may be viewable externally, such as mounted on an outside surface of the housing. In another example, the display may be implemented externally, such as on a mobile device such as a mobile phone, tablet computer or laptop. In such example, the system 200 may utilize the communication interface 216 that is configured to communicate with the device containing the display 218 through a communication link (demonstrated by dashed line), such as a wireless link (e.g., Bluetooth, WiFi, cellular data or ZigBee or the like). A physical connection could also be used to connect to the display 218.

In the example of FIG. 5, the measurement subsystem 206 includes an NIR spectrometer 220, an ultrasound device 222, an MR spectrometer 224. In this example, the MR spectrometer 224 is configured as a combined MR spectrometer (e.g., by sharing various components) to record NMR and/or NQR measurements, such as may be controlled by the computing subsystem 208 according to an operating mode of the analysis technology. In other examples, separate NMR and NQR spectrometers may be utilized, which may increase the overall size of the system 200.

The system 200 also includes a sample space 228 that is arranged to enable measurements of the object 202 by the measurements system. For example, the sample space may be external to the housing of the portable apparatus 204 adjacent a window or opening through which measurements are made. Alternatively, the sample space 228 may be within the housing. The sample space 108, for example, can include a receptacle or other sample holder to receive the object 202 being tested.

As an example, the NIR spectrometer 224 includes an infrared (IR) transceiver 230 that includes a light source (e.g., incandescent light bulb or LED), a detector (e.g., charge-coupled devices (CCDs) or other silicon-based detectors, InGaAs photodiodes, etc.). The IR transceiver 230 also includes a dispersive element (such as a prism, or, more commonly, a diffraction grating) to allow the intensity at different wavelengths to be recorded by the detector, which can be stored as in the memory 212 as NIR feature data 232.

The MR spectrometer 224 may be configured to operate according to the type and construction of the object 202 being authenticated and which analysis technology is selected for making a given measurement. For example, MR spectrometer is configured to record MR measurements (e.g., low field NMR or NQR measurements) for the object 202 under test. As a further example, the MR spectrometer 224 an MR field source 236, which may include an electromagnet or a permanent magnet, configured to generate a magnetic field 238 in the sample space 228 for subjecting the object to the field for implementing MR spectrometry. The MR spectrometer 224 measures the electromagnetic spectrum from the sample in response to the magnetic field from the field source 236 to provide corresponding feature data, which may be NMR data 240 or NQR data 242. The magnetic field 238 may be static or variable such as in response to control commands from the computing subsystem 208, such as depending on the type of MR spectroscopy being implemented. As disclosed herein, the MR spectrometer 224 can be configured as a low-field NMR spectrometer or an NQR spectrometer. As used herein in relation to NMR, "low-field" refers to a generating a magnetic field ($B_0$) without the aid of superconductors. In practice, this usually restricts the $B_0$ field strength up to about 1 T. In an example MR system configured to perform NQR, the magnetic field applied to the sample is even smaller than NMR, such as less than about 0.5 mT.

As a further example, the MR spectrometer 224 includes a radio frequency (RF) power source, a coil to produce the magnetic excitation field and a detector circuit which monitors for an RF MR response from object 202 under test (in the sample space 228). The detector circuit can include a matching network 244 and an analog front-end 246 for initial signal processing (e.g., filtering and amplification) of the measured MR signals. For example, the matching network 244 is a digitally-controlled impedance matching network that enables the MR spectrometer to operate as an NQR spectrometer in a wide frequency range (e.g., about 0.9-3 MHz). This enables the operating frequency to be set freely by the instructions 214, while also ensuring comparable sensitivity to narrow band systems over the entire range. Such a system also can quickly switch between multiple resonant frequencies of the same compound to improve the accuracy and reliability of NQR-based measurements.

As an example, the ultrasound device 222 includes a signal generator for producing an outgoing signal and a transducer (e.g., one or more piezoelectric transducers) for converting the outgoing signal to outgoing ultrasound signal. The transducer may also be configured to convert at least a portion of ultrasound reflected by the object to an incoming signal. The device 222 further may include circuitry convert the incoming signal to a corresponding digital signal for processing by the computing subsystem 208. The computing subsystem 208 is programmed to analyze the ultrasound signals (e.g., outgoing and incoming signals) to determine ultrasound features that are stored in the memory 212 as ultrasound data 248 representative of physical properties of the object 202. For example, some of the outgoing ultrasound signal passes through the object is scattered and absorbed by the discrete phase with the result that the intensity of the transmitted signal is diminished. An attenuation coefficient for the ultrasound signal is a function of ultrasonic frequency and depends on the composition and physical properties of the object 202 under test. The attenuation coefficient and other ultrasound parameters may be stored as the ultrasound feature data 248.

While the computing device 120 is shown as integrated in the housing of the portable system 106, in other examples, some or all computing instructions 214 may be implemented at a remote system 250, such as in a cloud computing system, web service or other computing system, and accessed by the computing subsystem 208 through the communications interface 216 over a communications link 252. For example, the link 25 may be implemented as wireless or physical connection, which may include a network, such as a local area network or a wide area network, such as the Internet and/or a computing cloud in which the remote system operates. In an example, the apparatus 204 is implemented as an internet-of-things (IoT) device that utilizes the communication interface 216 to maintain the link 252 for communicating process and results with the remote system 250 based on the analyses and authentication that is performed. In some cases, the remote system 250 can provide instructions to program the computing subsystem (e.g., periodically or in real time, such as for each authentication process) to control which analysis technology to use at the respective locations and/or how to aggregate feature data for signature generation.

By way of example, the instructions 214 are programmed for control and data processing functions (e.g., corresponding to methods 10, 50 and/or 110), which includes program code to control each of the analysis technologies 220, 222 and 224 as well as to analyze the NIR data 232, NMR data 240, NQR data 242 and the ultrasound data 248. The instructions 214 further are programmed to determine the feature data 207 and to generate a tag signature for the object 202 based on the feature data. In an example, the feature data 207 may be in the form of a feature vector that includes a plurality of data points describing the measurements for each of the measurement locations across the object according to the analysis technology that is used at each such location.

For example, the analysis can include analyzing the NIR measurements to determine NIR feature data 232 that specifies optical (spectroscopic) properties of the object 202. The instructions 214 further can be programmed to control performing MR spectroscopy and to analyze the MR data quantitatively to further determine features representative of chemical properties of the object 202. For example, the NMR or NQR feature data for each of the locations includes one or more of spectrum amplitude, decay time and linewidth. As an example, different concentrations of one or more chemical elements may be applied to at least two different spatial locations of the solid object 202. In another example, the concentration of a given chemical element is different for at least some of the different spatial locations. As yet another example, a deterministic concentration of a given chemical element further may be applied for each of the different spatial locations. The instructions 214 thus may include program code to compute a value of the feature data for each of the spatial locations that is proportional to the concentration of each chemical element and/or chemical compound at each respective location that includes a chemical tag based on the feature data 207 generated from the analysis implemented by one or more of the analysis technologies 220 and 224. Additionally, or alternatively, instructions 214 thus may include program code to compute a value of the feature data for each of the spatial locations that is representative of physical properties of the object at respective locations that include physical tagging (e.g., a change in texture or physical structure) based on the feature data 207 generated from the analysis implemented by the analysis technology 222. As mentioned, in some examples the feature values determined for a given tag location may be derived from measurements made according to more than one analysis technology of the measurement subsystem 206.

The instructions 214 further are programmed to determine the tag signature for the object by aggregating (e.g., concatenating or implementing other processing) the values stored as the feature data. The tag signature that is generated by signature generating code (of instructions 214) is stored in the memory 212 as signature data 256. Additional data may be added to the signature, including process parameters, settings and operating parameters of the system, measured environmental conditions (e.g., temperature and pressure) time and object identifying data. In some example, the signature data 256 is stored 254 in a data repository, which also may include other data identifying the solid object or other relevant information about the authentication process, such as user information (user name or other identifier) and information about the test and/or environmental conditions (e.g., time, date, location, temperature, pressure etc.).

For purposes of authentication, the instructions further include an authentication method, such as programmed to perform the method of FIG. 2 or 4. For example, the instructions 214 include code to analyze the number of locations distributed across a given surface of the solid object according to one or more analysis technologies to determine corresponding feature data 207 for each of the locations, such as disclosed herein. The instructions 214 may also include program code to generate an evaluation signature based on the corresponding feature data for at least some of the locations. The instructions 214 may also include program code to compare the evaluation signature with the stored tag signature to authenticate the solid object. For example, if the comparison indicates that the evaluation signature matches the stored tag signature, the object is authenticated as being a legitimate product. Alternatively, if the comparison indicates that the evaluation signature fails to match the stored tag signature for the object, the object may be identified as counterfeit. In response, an alert may be set to the remote system to identify the results of the authentication.

Figure 6:
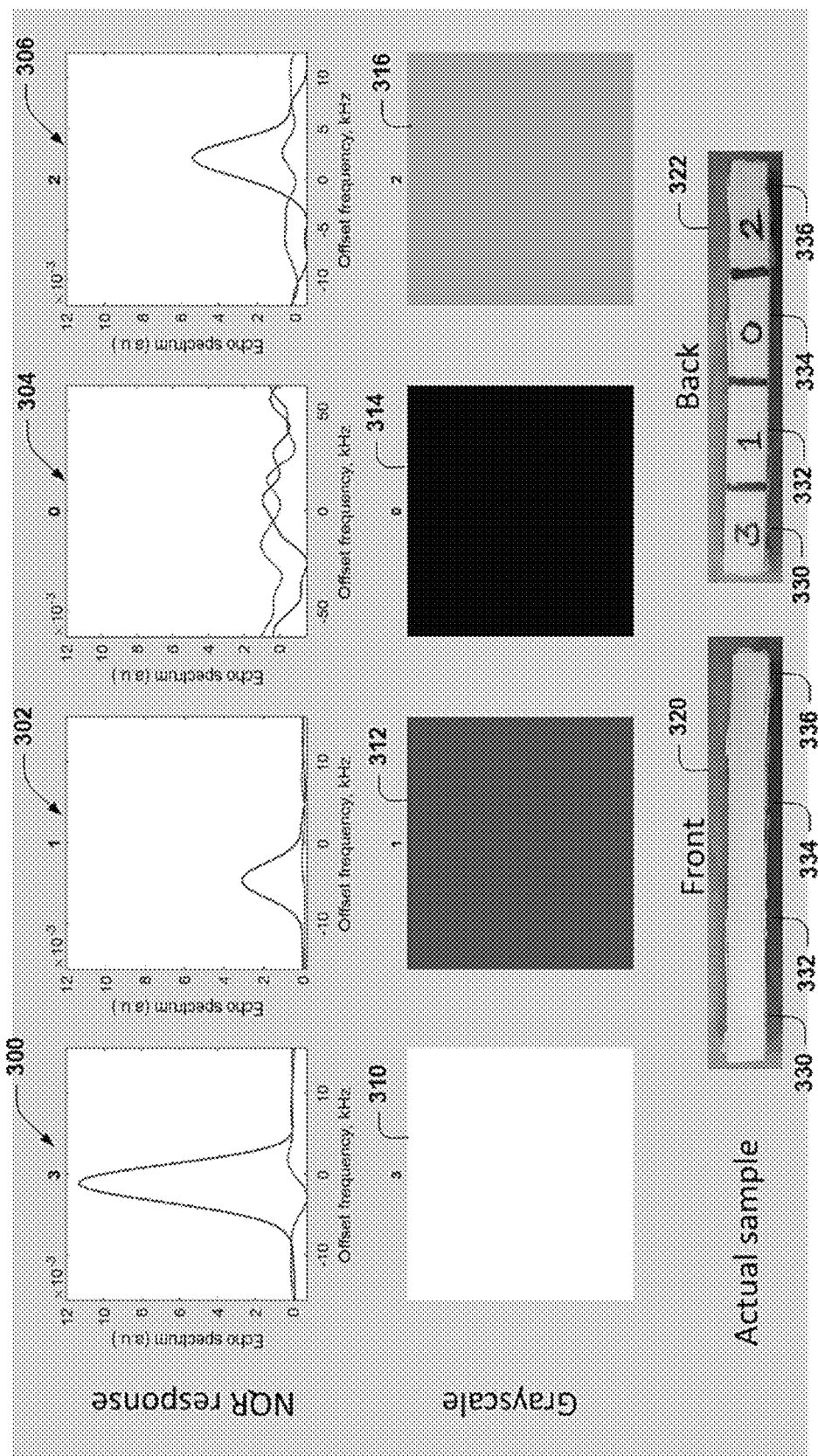
FIG. 6 depicts an example of generating a multibit signature for an object.

FIG. 6 depicts an example of generating a multibit signature for an object 320 using NQR as the analysis technology. As shown, the object includes a tag having a plurality of tag locations 330, 332, 334 and 336 spatially distributed across different parts of the object 320. In the example of FIG. 6, the feature used for each of a plurality of tag locations 330, 332, 334 and 336 corresponds to a spectrum amplitude generated from spectrometry analysis (e.g., an NQR response) at each of the tag locations. The spectrum amplitudes for each of the locations 330, 332, 334 and 336 are demonstrated in respective plots 300, 302, 304 and 306 of echo spectrum (arbitrary units) as a function of frequency for an NQR response (e.g., using spectrometer 224). Specifically, the NQR response for each tag location 330, 332, 334 and 336 exhibits a different amplitude to provide a corresponding feature value for each respective location. The feature value for more than tag location may be the same in other examples.

FIG. 6 also depicts the gray scale encoding for the feature data measured for each tag location of the object. By way example, the amplitude values from the plots 300, 302, 304 and 306 may be encoded according to a multi-bit gray scale, demonstrated at 310, 312, 314 and 316, respectively. In this example, the gray scale encoding 310, 312, 314 and 316 corresponds to scaled feature data having values having values "3", "1", "0" and "2". For example, the values indicate the relative amount of the applied chemical tag (e.g., $NaClO_3$) inside the tag. This distinction is demonstrated by the differences in the amplitude of the response spectrum amplitude plots 300, 302, 304 and 306. Analysis of each part of the tag can be done separately and the difference in feature values can be seen as demonstrated in FIG. 6.

The example signature determined for the object 320 was based on NQR responses measured for each of the tag locations 330, 332, 334 and 336. In other examples, a different analysis technology could be selected to determine feature data for each tag location of the object. Additionally or alternatively, feature data may be determined by using more than one different type analysis technology (e.g., NIR, NQR, NMR, ultrasound, etc.), as disclosed herein.

Figure 7:
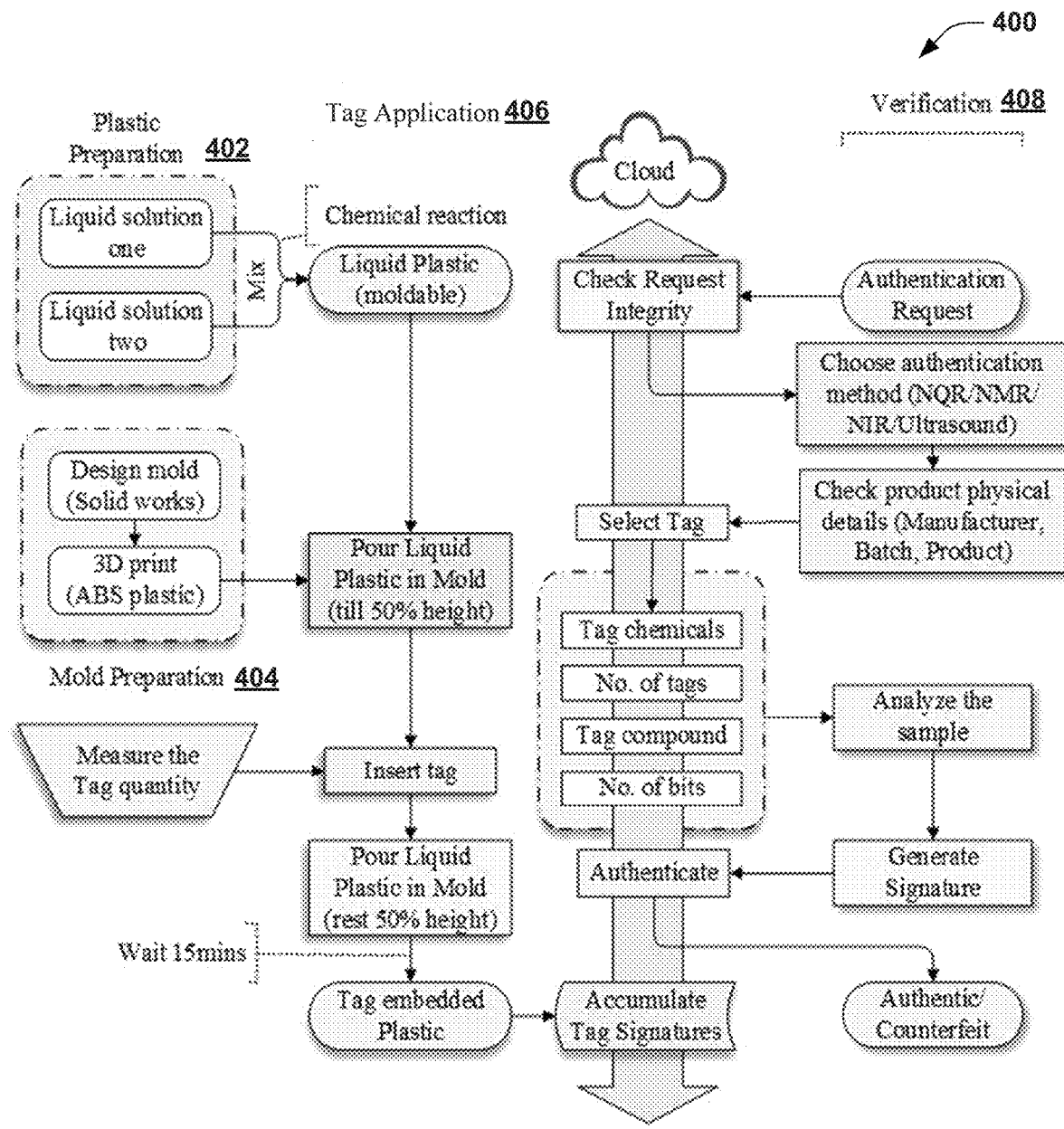
FIG. 7 depicts an example of a workflow diagram for spectroscopic analysis of an object.

FIG. 7 depicts an example of an overall workflow process 400 of tagging of an object and spectroscopic analysis thereof for generating a signature and subsequent authentication of the object that has been tagged. In this example, the workflow process 400 includes plastic preparation 402, mold preparation 404, tag application 406 and verification 408. In the example of FIG. 7, the preparation 402 includes preparing one or more solutions of chemical elements that are mixed to provide the chemical tag that is to be applied to the object. The tagging 406 includes applying a chemical tag and/or a physical tag to respective locations across a solid object. For example, the chemical tag (e.g., a given concentration of one or more chemical elements) may be embedded in the object, such as within a plastic or other material from which the object is fabricated. The tag that is applied can be covered by the substrate material forming the object (e.g., plastic in this example). The substrate material applied over the chemical tag may also include a physical tag, such as by changing the mesoscopic texture of the substrate. The verification process 408 to authenticate an object includes evaluating the tag(s) at each location to generate an evaluation tag signature, such as disclosed herein. The evaluation tag signature is then compared to a predetermined tag data for the object for authentication, namely, to identify the object as authentic or counterfeit. For example, a library of data and processes for authenticating any number of objects can be stored in non-transitory media, such as in a computing cloud, which a user device (e.g., the system 200) may interact before and/or during authentication.

By way of example, a simple example of the concept of a tag can be made with reference to a barcode. Any part of the object, which is easily accessible, can be used as a location to hold this tag (like a barcode). That part of the object contains different chemicals at specific locations with pre-allocated amounts which may be invisible to the naked eye. This tag can be accessed or analyzed only with the respective analysis technology (NQR, NMR, NIR, or ultrasound). Even if the counterfeiter knows which technology to use, it is difficult to realize the chemical element(s) used for tagging and its concentration. Each part of the tag may be configured to provide a different response, such as depending on the concentration and composition of chemical elements, including those in the applied tag and, when embedded within the object, the surface of the object covering the tag. Together, it becomes a complex chemical tag with a multi-bit signature, which cannot be seen on the object.

Figure 8:
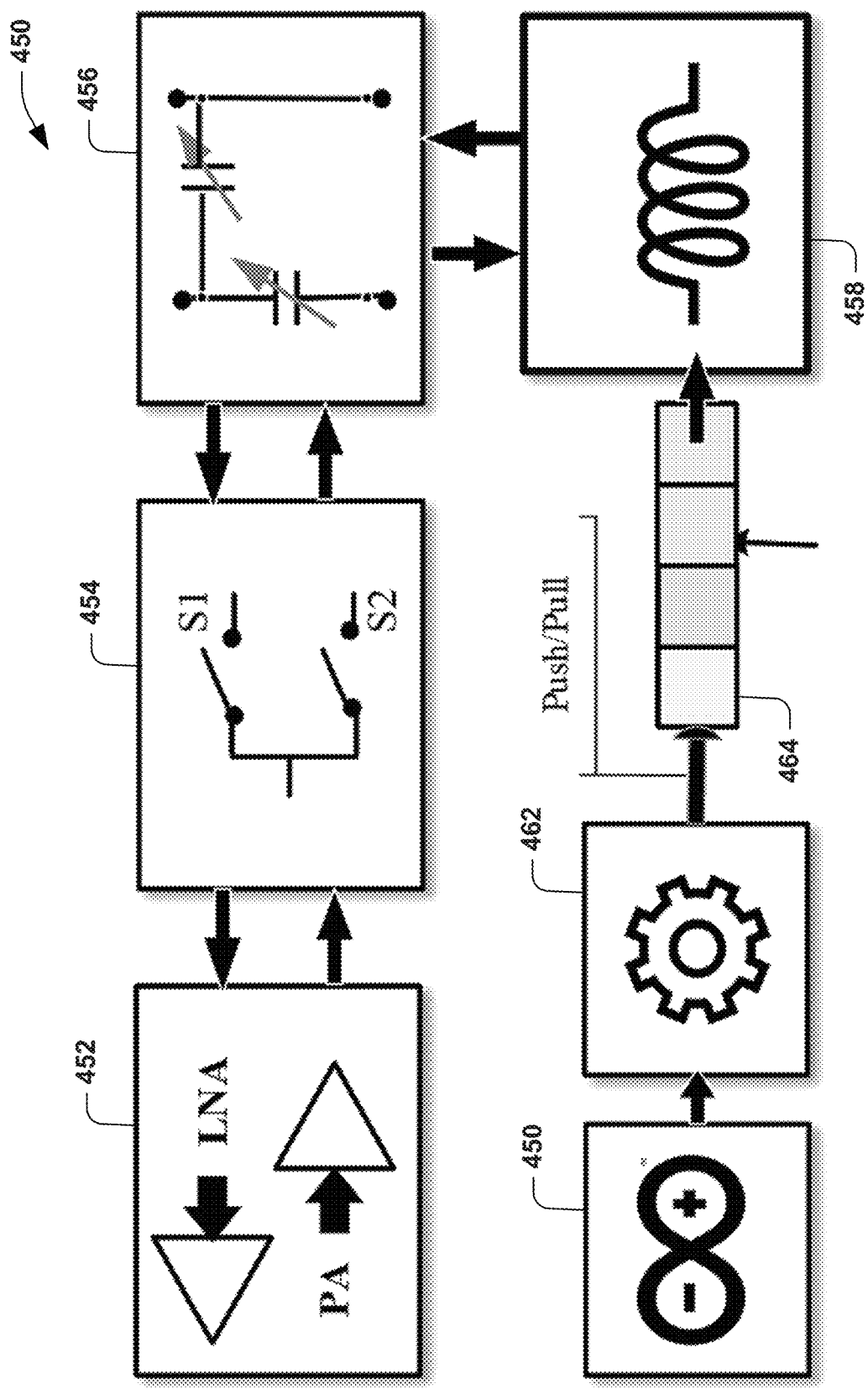
FIG. 8 depicts an example of a system 450 to authenticate an object.

FIG. 8 depicts an example of a system 450 to authenticate an object, such as by analyzing tags applied to the object. The system 450 may correspond to part of the system 200. The system 450 includes a spectrometer 452 includes a radio frequency (RF) power source (power amplifier) to provide RF energy to a coil 458 for producing a magnetic excitation field. The spectrometer also includes a low noise amplifier and a detector circuit configured to measure an RF NQR response coming from the object in response to the applied field. The system further may include a duplexer 454 to enable bidirectional communication of the applied and measured signal from the coil 458. A matching network 456 is configured to provide impedance matching to minimize signal reflections. The system 450 further may include a controller 460 configured to control an actuator 462. For example, the actuator is configured to move an object 464 so that different parts of a tag applied to the object are brought into sensing range (FOV) of one or more analysis technology, which in this example includes the coil of the spectrometer 452.

Figure 9:
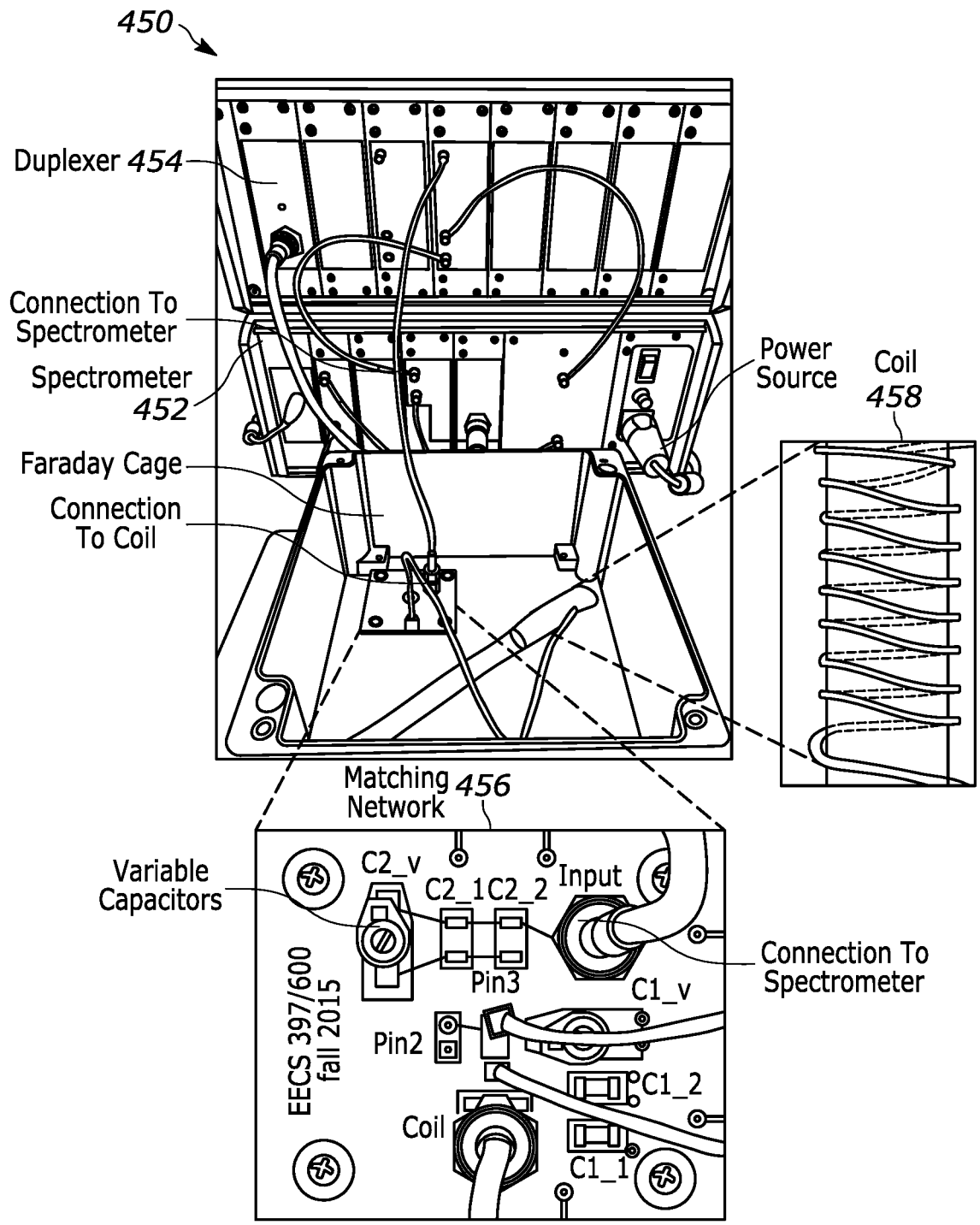
FIG. 9 depicts an example of a prototype system.

FIG. 9 depicts an example of a prototype system 450, corresponding to the block diagram of FIG. 8, which can be used to analyze a chemical tag applied to an object. In this example, the same reference numbers refer to the same parts and feature in the example of FIG. 8. Thus, the system 450 includes a spectrometer 452, duplexer rack 454, matching network 456, and solenoid coil 458. The inductive detector (e.g., solenoid coil on a 10 mm test tube) and an impedance matching network may be mounted inside a Faraday cage to decrease environmental radio frequency interference (RFI). The matching network 456 is connected to a bench-top magnetic resonance (MR) spectrometer (e.g., Kea2, Magritek) 452 that contains a power amplifier (PA), low-noise amplifier (LNA), and transmit-receive switch (duplexer). The PA operates as a transmitter and the LNA as a receiver, while the duplexer switches the coil and matching network amongst transmit and receive modes. The spectrometer is powered by a power supply (e.g., by two 12V, 18 Ah lead-acid batteries connected in series). The spectrometer 452 may be controlled from a computer (e.g., internal or external to the system 450 via a graphical user interface (GUI) that enables the user to create pulse sequences and store the acquired data.

The system 450 includes a sample holder, on which the solenoid coil 458 is wound. The sample holder may be utilized for both excitation and detection, such as by creating a RF magnetic field that generates transitions between the nuclear energy levels in transmit mode, and inductively detecting the subsequent time-varying magnetic flux in receive mode. As an example, the solenoid coil 458 is created by winding a length of wire (e.g., AWG20 wire) with a number (e.g., 1-15 or more) turns around a hollow NMR tube (e.g., of height 120 mm and base diameter 10 mm). The wire may be attached to an external surface of the tube by tape or other adhesive material (not shown) to hold the coil fixed to the tube. The solenoid is then mounted inside the Faraday cage, to reduce RFI and house the matching network.

The systems and methods disclosed herein can give a new dimension for the security and authenticity for any product made of these materials. It is not restricted to one single authentication model. It can be considered as a customizable security, which adapts to the environment of the material to be authenticated. Being invisible to the naked eye with unclonable variable complex signature, this type of authentication technique holds a significant advantage over other physical authentication techniques. It can significantly reduce the losses occurring in industry due to counterfeiting, tampering, and rebranding. Also, it can help the end consumer in getting reliable, authentic, and safe products. Based on this disclosure, it is understood that various approaches may be used to increase the complexity of the tag, such as by introducing more number of bits, using multiple types of analysis technologies, implementing an automatic authentication setup (e.g., to receive setup instructions during authentication from a remote system), and use of multiple chemical elements in a single tag.

In some examples, the measurement subsystem may include an integrated NQR (iNQR) system to enable manufacture of an authentication device in a small form factor to enable it to be portable and even a handheld device. As one example where the measurement system implements a single analysis technology such as NQR, the authentication system may be implemented as a handheld system (e.g., system 204, 450, 500) with the measurement subsystem implemented according to the example iNQR systems of FIGS. 10, 11, 12, 14 and 15. In such example, the iNQR system thus may be the only analysis technology used for authentication device or, in other examples, it may be one of a plurality of different analysis technologies, such as disclosed herein (see, e.g., multi-modal measurement system of FIG. 5). The iNQR system is configured to use nuclear quadrupole resonance (NQR) spectroscopy, such as to verify the identity of a wide variety of high-value-added items, including pharmaceuticals, dietary supplements, food items, and branded products. The iNQR system is an autonomous and portable version of the benchtop NQR setup described in the previous paragraph. Because the system is wholly integrated, it is completely independent of external spectrometers (e.g., the Magritek Kea-2), thus making the entire system autonomous.

Figure 10:
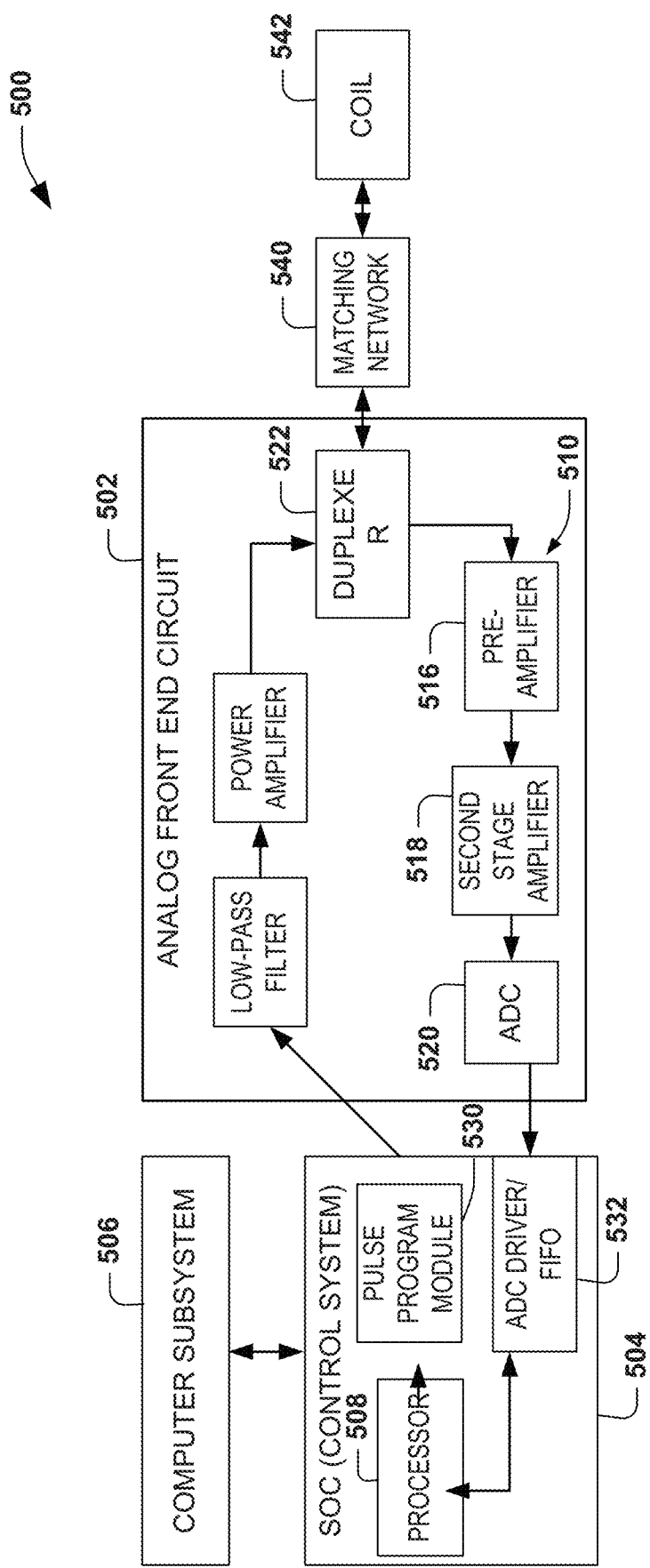
FIG. 10 is a block diagram of an iNQR system.

FIG. 10 is a block diagram of an iNQR system 500. The iNQR system 500 includes an analog front-end (APE) circuit 502 that is configured to perform functions commensurate with an external spectrometer. The AFE 502 cooperates with a control system 504 that is configured to operate as the main system controller. In an example, the control system 504 is implemented as System-on-Chip (SoC) or system-on-module (SoM) architecture. The control system 504 also is configured to perform data processing for measurements implemented by the system 500, thereby reducing the dependence on an external computer, demonstrated as computer 506. In an example, the system 500 is configured to directly connect the system to the cloud or other remote system to share data through a wireless link, such as using a USB Wi-Fi module, cellular data module, or other wireless communications interface (e.g., corresponding to interface 216).

By way of example, the SoC may include both a hard processor 508 and field programmable gate array (FPGA). Such hybrid arrangement can provide high-level programming capabilities that are similar to that of a personal computer, while also preserving the precision timing capabilities of an FPGA. In an example, the hard processor 508 includes an embedded ARM core; such cores are in widespread use within mobile devices and embedded systems (e.g., single board computers such as the Raspberry Pi). Additionally, the system 500 may use a low-cost commercial SoC development board to realize a miniaturized yet powerful and highly programmable NMR spectrometer. The chosen chip may integrate a dual-core ARM processor that is capable of running an embedded Linux operating system (OS) together with (i) programmable logic (e.g., a Cyclone-V FPGA fabric), (ii) a limited amount of memory, and (iii) on-chip buses for data transfer between the ARM processor and the FPGA fabric. The ability to run an embedded OS enables use of high-level programming languages (e.g., C, Python, shell scripts, etc.) directly inside the spectrometer system 500. Other advantages of the OS include its ability to handle a large amount of storage, use different networking protocols (including wireless ones), and run a graphical user interface (e.g., user interface 254) programmed to configure and implement functions in response to a user input. The OS further makes it possible to switch between different FPGA implementations on-the-fly. The SoC's capabilities further may be leveraged to make the NQR spectrometer portable and self-contained. In particular, the device incorporates abilities to adapt itself to different conditions by performing self-tuning to find its optimum configuration for a given environment, sensor, and sample.

The AFE 502 may be implemented on one or more printed circuit boards. The AFE 502 includes a transmitter 508 and a receiver 510. In the illustrated example, the transmitter includes a low-pass filter 512 and power amplifier 514. The receiver 510 includes a low-noise preamplifier 516, a second-stage amplifier 518, and an analog-to-digital converter (ADC) 520. The AFE 502 also includes a passive duplexer.

The control system 504 provides a digital back-end for controlling main system functions and data processing. The control system 504 may be implemented on a circuit board (e.g., a Terasic DE1-SoC Altera development board) or integrated in an SoC. In the example of FIG. 10, the control system 504 includes a pulse program module 530 and an ADC driver and first-in-first-out (FIFO) buffer 532, such as implemented on the FPGA side of the board. An operating system may be implemented on the ARM processor side of the board.

By way of example, the transmitter 508 uses class-A push-pull linear power amplifier 514 with differential inputs and a single-ended output. The design allows the user to select between two output stages with different power handling capabilities (2.5 W up to 40 MHz, or 10.6 W up to 11.6 MHz). The input may be directly driven by output terminals of the control system 504 (e.g., by two FPGA pins that generate differential square-wave signals), which allows us to avoid the use of a high-speed digital-to-analog converter (DAC). The low-pass filter 512 may be implemented as a multiple-feedback differential low-pass filter configured to filter out harmonics of the square-wave. This approach may require the low-pass filter to be programmable to operate over broad frequency ranges, as may be needed in several applications of the autonomous NQR system. For example, such tuning may utilize switched resistors or digitally controlled potentiometers. As a further example, the duplexer 522 is a passive lumped duplexer. The circuit has a low quality factor (Q) which provides sufficient bandwidth and eliminates the need for digital tuning.

As a further example, the preamplifier circuit 516 uses a common-gate topology using a low-noise junction field-effect transistor (JFET) with the tuned output load. The output load may be an LC circuit consisting of a fixed inductor in parallel with varactors (i.e., voltage-controlled capacitors). In this example implementation, both the varactors and preamplifier input bias voltage are digitally controlled using a dual-output digital to analog converter (DAC), allowing the input impedance and frequency response to be set using the software. To digitize the amplified receiver outputs, the ADC may be implemented as a multibit, high-speed (ADC (e.g., a 14-bit, 25 Msps) parallel-output ADC. A high-speed parallel ADC facilitates satisfying Nyquist sampling over the expected 1-3 MHz NQR frequency range for $^{14}$N, thus eliminating the need for under-sampling techniques such as bandpass sampling. An even higher sampling rate (e.g., 100 Msps) may be used for $^{35}$Cl NQR. Moreover, the parallel output bus allows the clock rate to be significantly lower than for a serial ADC, which simplifies the ADC interface design. The ADC clock may be digitally programmable using a reconfigurable phase-locked loop (PLL), which allows the sampling frequency to be easily programmed using the software.

The system 500 also includes a matching network 540 that is coupled between the duplexer 522 and a coil 542. For example, the matching network 540 is a digitally-programmable broadband tunable impedance matching network configured to change its resonance frequency (i.e., be "tuned") from 1.5 MHz to 3 MHz for $^{14}$N NQR measurements. A similar network can be used to tune over a higher frequency range (20-35 MHz) for $^{35}$Cl NQR. Other types of matching networks may be used in other examples, such as depending on the application of the system 500 (which provides most of the benefits of a truly broadband network without the attendant disadvantages.

For example, the matching network 540 includes a classic two-capacitor impedance matching network, either in a series-parallel or parallel-series configuration depending on the size and inductance of the sample coil 542. The efficiency of this network is defined as the ratio of power delivered to the coil to total input power. The efficiency can be written as a function of frequency, as shown in Eq. (1), and should be as close to 100% as possible:

$$\eta(f) = P_{coil}(f)/P_{in}(f). \tag{1}$$

Besides, the input impedance of the network (here assumed to be in the parallel-series configuration for simplicity) is given by:

$$Z_{in}(\omega) = \frac{1}{j\omega C_2} + \frac{(j\omega L + R)\frac{1}{j\omega C_1}}{(1 - \omega^2 LC_1) + j\omega RC_1} \tag{2}$$

where $C_1$ is the capacitor in parallel with the coil and $C_2$ is the capacitor in series with the coil. The equation shows that the impedance does not increase monotonically with frequency.

By way of further example, to swiftly tune and cover a wide range of frequencies, a multi-channel circuit may be used, in which C1 and C2 are divided into multiple channels (e.g., up to 12 for each). The capacitor values were approximately binary-weighted along the channels and controlled digitally by switches, thus resulting in an effective capacitance tuning range of approximately 1:2N, where N is the number of channels for each capacitor. The properties of the switches used in the impedance matching network 540 also affect the performance of the circuit. For example, the figure of merit (FOM) of the switches, which is generally defined as the product of on-state resistance (Ron) and off-state capacitance (Coff), directly determines the performance of the matching network and therefore influences the quality of measurements.

As a further example, switches may be selected for the matching network 540 from a variety of commercial devices. Mainly switches can be categorized into two different types: electromechanical and solid-state switches. One example is a PIN diode, a current-controlled device that is specifically developed for RF use. They have low $R_{on}$ and $C_{off}$ (i.e., low FOM) and high switching speeds, making them the preferred choice for switching RF power. However, PIN diodes do not work well at frequencies lower than $1/T_t$, where $T_t$ is the transit time through the device. At these frequencies, they behave like PN-junction diodes that distort the RF signal in both the "on" and "off" states due to voltage-dependent resistance and capacitance, respectively. Another option is FET switches, which depend on an electric field to control the conductivity of a channel in the semiconductor, and thus achieve "on" and "off" states. FET switches consume much less current than PIN diodes because they are voltage-controlled devices. However, they have relatively high $C_{off}$, which makes it difficult to tune the matching network precisely. Hybrids of PIN diodes and FETs are not beneficial either because of the same capacitance problem. Accordingly, in one example, the matching network is implemented using (i) electromechanical switches (reed relays), which have very low FOM (about 100× lower than FETs), for $^{14}$N matching networks, and (ii) PIN diodes for $^{35}$Cl matching networks. Both PIN diodes and reed relays have very low $C_{off}$, which is crucial for accurate tuning of the network. The relays do have a relatively slow response time of couple hundreds of microseconds, but this is tolerable in our application because the gaps between scans are typically in the range of tens to hundreds of milliseconds. Another potential drawback of relays is that they are affected by ambient magnetic fields. Fortunately, NQR, unlike NMR, does not require a static magnetic field.

As another example, a series-shunt capacitive impedance matching network is used with a target operating frequency range of 1.5-3.0 MHz. The typical Q value of the coil at the targeted frequency results in a bandwidth of <100 kHz. To cover the whole frequency range, a switched-capacitor impedance matching network is used, as explained above. The matching network uses relays and/or PIN diodes to switch capacitors, thus allowing the tuning to be digitally controlled from software. A directional-coupler-based reflection measurement (i.e., single-port network analyzer) is also implemented to quantify the impedance matching of the digitally tunable matching network, effectively closing a feedback loop for automatic tuning of the matching network.

Figure 11:
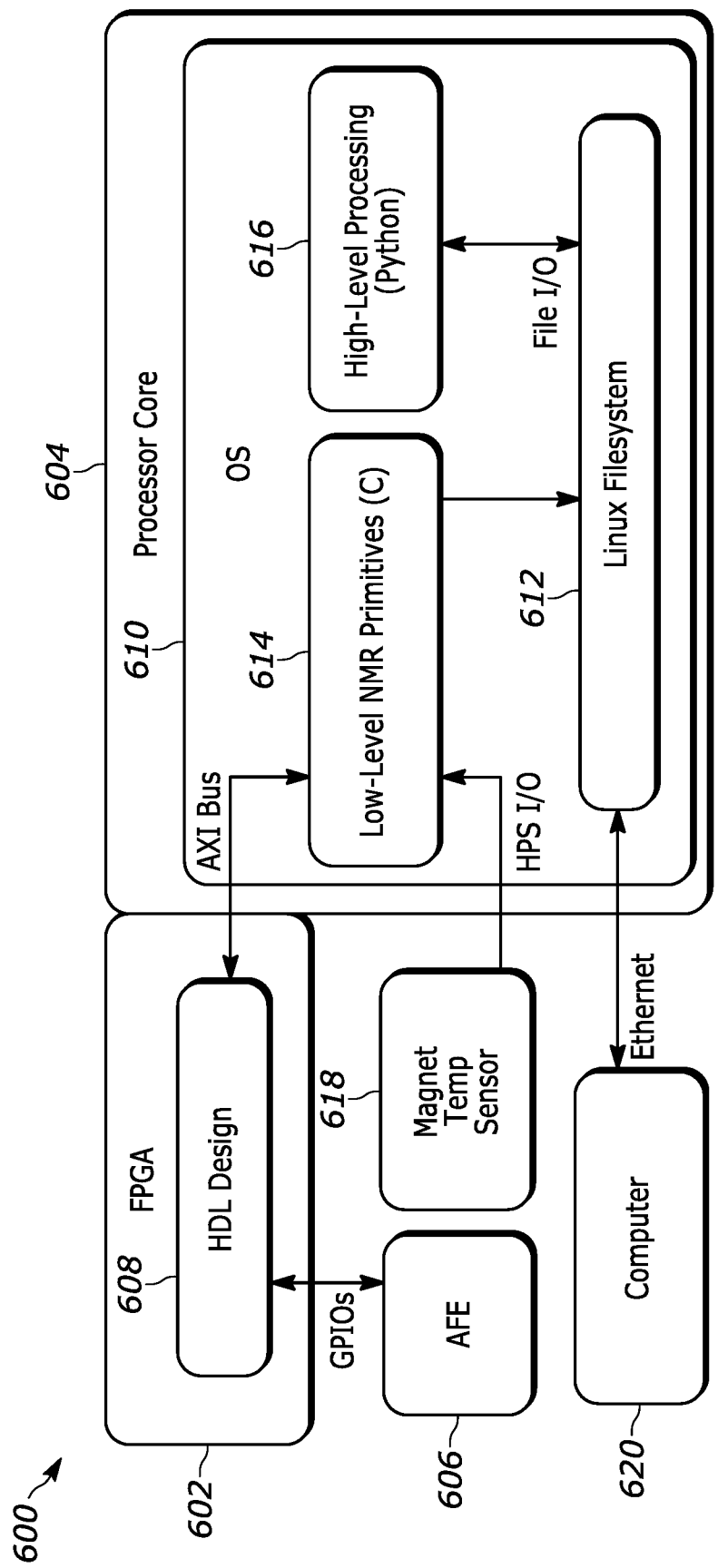
FIG. 11 is another example of an iNQR system.

FIG. 11 is another example of an iNQR system 600 depicting an example of a digital back-end architecture that may be implemented on the control system circuit 504. The back-end architecture includes an FPGA fabric 602 and a processor core 604 and is designed to be highly programmable while also being easy to maintain and update. The architecture of FIG. 11 illustrates how the data is transported in the system. For example, the two main segments are implemented on the FPGA fabric 602 and the processor core (e.g., an embedded ARM core) 604, which is also known as the hard processor system (HPS). The FPGA 602 interfaces with an AFE 606 (e.g., corresponding to AFE 502), such as using general-purpose input/output (GPIO) pins configured to allow it to tune the hardware, run the actual pulse sequence, and temporarily store the acquired data. As an example, the FPGA 602 is configured using a hardware description language (HDL) design 608 implemented in Verilog. A bus, such as an Advanced eXtensible Interface (AXI) bus, available within the SoC is used for bidirectional communication between the FPGA 602 and the processor core 604.

As a further example, the processor core 604 runs an OS (e.g., Ubuntu Linux OS) 610, and a file system 612 (e.g., the Linux file system) is used to transfer data between low-level NQR primitives (e.g., C programs) 614 and high-level processing functions (e.g., Python programs) 616. Also, a set of HPS input/output (I/O) pins may be used to input sensor data, e.g., the magnet temperature recorded by a temperature sensor 618, directly into the processor core 604. In some examples, Ethernet or another communication interface can be used to transfer data to/from an external computer (e.g., a PC or notebook computer or tablet computer or cell phone), such as for debugging and/or other purposes.

Figure 12:
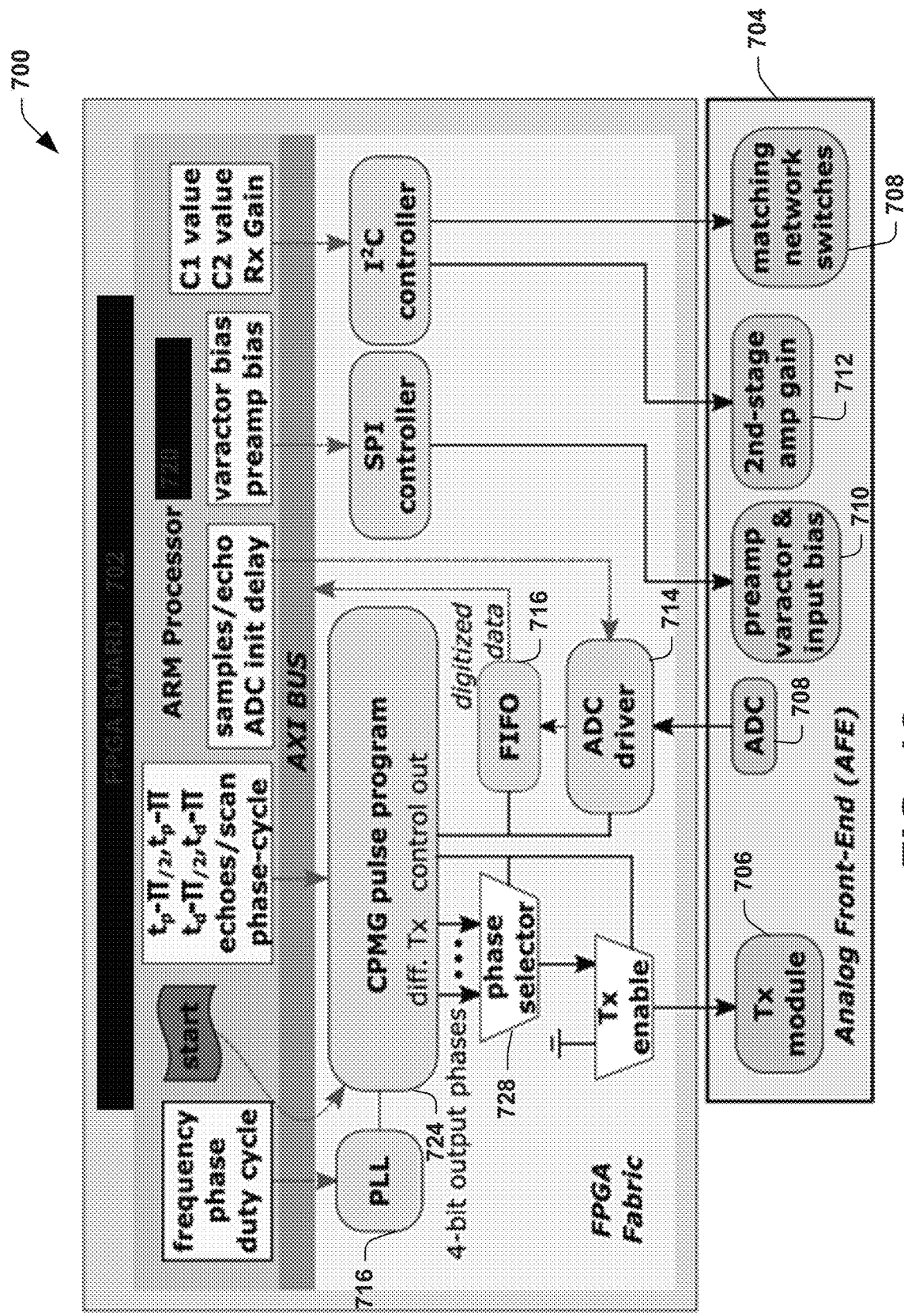
FIG. 12 is another example of an iNQR system.

FIG. 12 is another example of an iNQR system 700 depicting a block diagram of an example pulse program module (e.g., pulse program module 530) that may be implemented within an FPGA system (e.g., FPGA 504, 602). The system 700 also includes AFE circuitry 704, which includes a transmitter module 706, an ADC 708 and matching network switches 710. The FPGA 702 may use one or more busses (e.g., an SPI bus and an I$^2$C bus) to hardware parameters of the AFE 704, including preamp varactor and input bias values, shown at 712, and gain for the second stage amplifier (e.g., amplifier 518).

By way of example, data samples acquired by the ADC 708 are transported from the AFE 704 to an ADC driver 714 of the FPGA 702 via parallel GPIO pins and then stored inside a streaming FIFO buffer 716. In an example, the data samples may have a maximum length (e.g., a length of 128 kB) as may be limited by the amount of on-chip memory available. A direct memory access (DMA) transfer from the FIFO buffer 716 to on-board memory (e.g., SDRAM) may be implemented to expand the memory limit to 64 MB or more. 64 MB is enough to store 1.28 s worth of data samples at 25 Msps, which is practically sufficient for most low-field NQR applications.

In an example, the FPGA board 702 also includes a processor (e.g., an ARM processor) 720 to access data inside the FIFO or SDRAM via an AXI/Avalon memory-mapped bus (e.g., provided by Platform Designer-previously known as Qsys). For example, a C program running on the ARM processor 720 is used to transport acquired data from the FIFO 716 to a standard text file in the file system (e.g., Linux or other file system 612). This file can be directly transported to a remote computing device via Ethernet or another network interface if further processing in a more powerful software environment (e.g., MATLAB) is desired, for example, during system debugging. In practice, however, the availability of high-level (e.g., Python) programming in the OS allows most high-level NQR functions (e.g., corresponding to executable instructions 217) to run directly on the embedded ARM processor 720.

As an example, the high-level functions may include one or more of quadrature down-conversion, matched filtering, noise measurement, reflection measurement, frequency and pulse length sweeps, multi-exponential fitting of echo decay curves, and inverse Laplace transforms (ILTs) for generating $T_1$-$T_2$ maps. Also, having the ability to analyze the data without transferring it to an external computing device allows real-time hardware-software co-tuning, which is especially useful for portable spectrometers, such as disclosed herein. In a further example, a high-level (e.g., Python) program acts as the main control module and can run NQR experiments by calling executables (e.g., instructions 214) compiled from various low-level C programs. The latter programs may perform hardware tuning, run various NQR pulse programs, analyze the acquired data generated by the pulse programs 724, make the decision to change experimental parameters if necessary, iterate the process to get desirable results, and finally store the results (e.g., in a text file) and/or directly display them to the user (in a graphical format) on a display device of the iNQR system 700 (or on a display of a remote device coupled to the system via a wireless link). Examples of high-level measurement functions that may be implemented by the system 700 include averaging, frequency sweeps, pulse length sweeps, duty cycle sweeps, inversion recovery experiments, reflection measurements ("wobble" functions), and noise measurements.

As a further example, the FPGA 702 is configured to manage timing-critical operations, which include two fully synchronous building blocks, namely a pulse program module 724 and the ADC driver 714 coupled with the FIFO memory module 716. The basic pulse program module 724 in the FPGA may be configured to implement a generalized version of a spin-locked spin echo (SLSE) pulse sequence. For example, the user is to specify SLSE parameters, e.g., pulse length, number of echoes, number of points, and echo spacing, in a human-readable format via a user interface (e.g., interface 254), for example, by using microsecond (μs) units for pulse length. An I²C program automatically converts these values into integer values and sends them to control registers in the FPGA.

The pulse-program module 724 is implemented within the FPGA fabric of the SoC and communicates with the control program running on the OS by the processor 720 via an on-chip AXI bus. For example, derived integer parameters (e.g., pulse length, number of echoes, number of points, and echo spacing) are sent to the pulse program module 724 via the bus. For example, the module 724 uses the output of an on-chip fractional-N PLL 726 to generate the operating frequency, i.e., system clock. The PLL 726 provides programmable and precise frequency synthesis with sub-Hz resolution. The pulse program 724 is configured to generate two differential output signals with phase selector control 728 to select pulse phases in a rotating frame defined by the system clock, for example, the x-phase and y-phase pulses used in the SLSE sequence. After this, the overall transmit output signal is enabled or disabled by a control signal also generated by the pulse program 724. In the receiver path, the data from the ADC 708 is captured by the ADC driver 714 and then stored in the FIFO 716 for subsequent processing and analysis.

In an example, the phase selector control 728 is configured to implement phase-rotating the average echo shape acquired in one scan to match those from previous scans, thus enabling averaging across cycles. In another example, the absolute phases for all measurements may be set to be identical, i.e., by synchronizing the system clock, NQR transmit clock (i.e., RF frequency), and the ADC clock. For example, the system clock frequency is chosen to be 16×, and 4× of the NMR transmit clock and ADC clock, respectively. An ADC clock frequency of 4× the NMR transmit frequency is chosen to simplify future implementations of quadrature down-conversion within the FPGA 702. A system clock frequency of 16× the transmit frequency may be chosen to (i) allow more pulse phases (up to 16) to be generated; and (ii) provide some flexibility during the logic design of the pulse program module.

Variations in the absolute phase of the transmitted signal between the refocusing pulse in one scan may also introduce problems. For example, such variations cause additional transverse relaxation, and the effect increases at low NQR frequencies and high RF power levels. Therefore, the FPGA 702 may be programmed to synchronize the absolute phase of the transmit signal for every refocusing pulse. In this example, absolute phase control is performed by only enabling output to transmit signals when a counter driven by the system clock counter reaches multiples of 16. This approach ensures that all pulse lengths and time delays are integer multiples of the NMR transmit clock period (i.e., the period of the RF waveform). As a result, pulse lengths will shrink or expand by a small amount during frequency sweeps depending on the closest available match between the lengths specified by the user and the period of the system clock multiplied by 16. Fortunately, such changes in pulse lengths are generally small enough to have no significant effect on the acquired signal. Other FPGA designs may be implemented to avoid this effect if desired, and each design is stored as a file on the SoC to facilitate switching between different FPGA designs. For example, the system 700 may be reconfigured to switch to another FPGA implementation that decouples the transmit and system clocks, which allows pulse lengths and delays to remain strictly constant as the transmit frequency varies. Other FPGA designs may be used in other examples according to application requirements.

As a further example, the control system (e.g., control system 504) may be configured to implement sample pre-polarization to significantly improve the sensitivity of NQR spectroscopy, such as part of the iNQR setup. For example, the control system pre-polarizes sample objects within a magnetic field (denoted by $B_0$) for a programmable period of time before removing the field in an adiabatic manner. NQR measurements are then carried out at zero or near-zero field inside the sample coil disclosed herein. The adiabatic field removal (i.e., demagnetization) step uses one of three schemes: i) mechanical motion of the sample out of a Halbach-type permanent magnet, ii) mechanical motion (e.g., rotation with respect to each other) of two concentric Halbach magnets that surround a fixed sample, and iii) decrease in the current flowing through an electromagnet that surrounds a fixed sample. These schemes are mutually non-exclusive and can be easily combined as desired.

Figure 13:
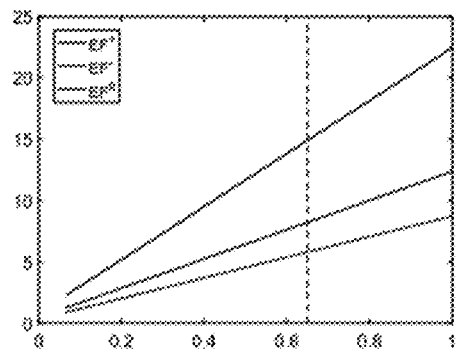
FIG. 13 illustrates typical enhancement in $^{14}$N NQR signal amplitude.
Figure 14:
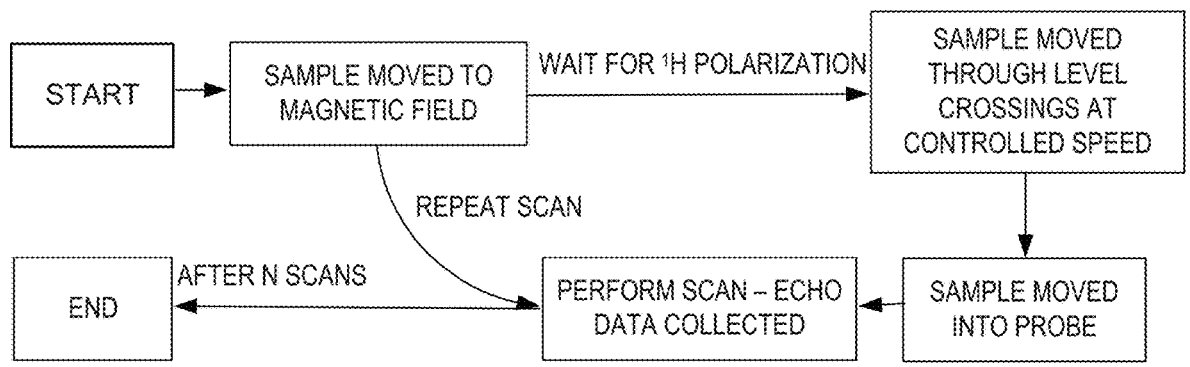
FIG. 14 is a flow diagram illustrating operation of NQR experiments.

As a further example, adiabatic polarization transfer between protons and nearby $^{14}N$ nuclei in the sample occurs during the demagnetization step, which significantly increases the amplitude of the detected NQR signals (and thus their SNR), such as shown in FIG. 13. FIG. 13 illustrates typical enhancement in $^{14}N$ NQR signal amplitude provided by pre-polarization as a function of pre-polarization field strength. The demagnetization profile $B_0(t)$ and other scan parameters are completely programmable as shown in FIG. 14. For example, FIG. 14 is a flow diagram illustrating operation of NQR experiments with polarization enhancement based on demagnetization via sample motion, which is performed between scans. The number of repetitions are dependent on the intrinsic signal strength and desired SNR. This programmability affords a high level of control over the polarization transfer process and allows it to be optimized for various sample objects and applications.

Figure 15B:
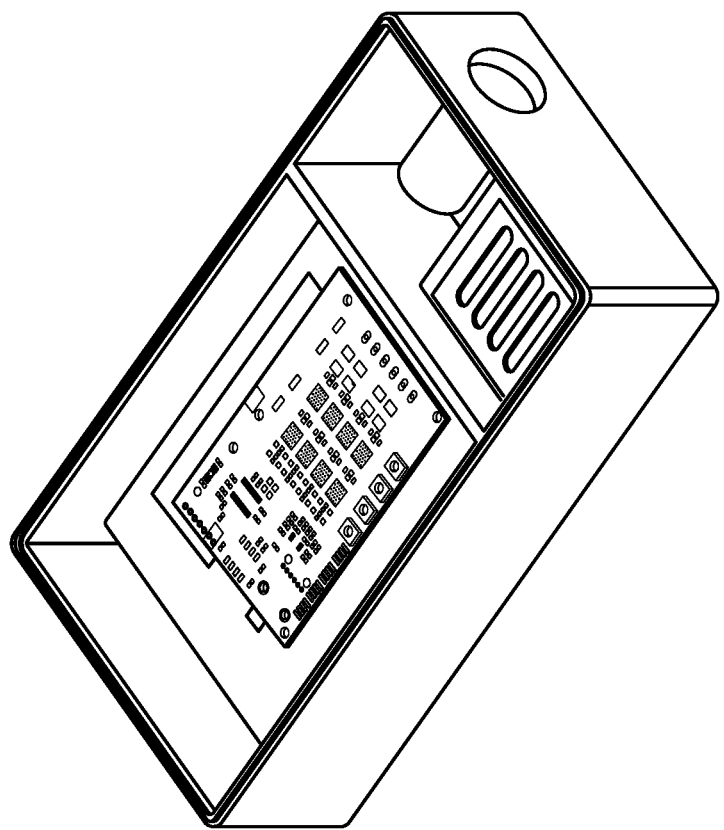
FIGS. 15A-15F depict different views of an example portable iNQR system.
Figure 15A:
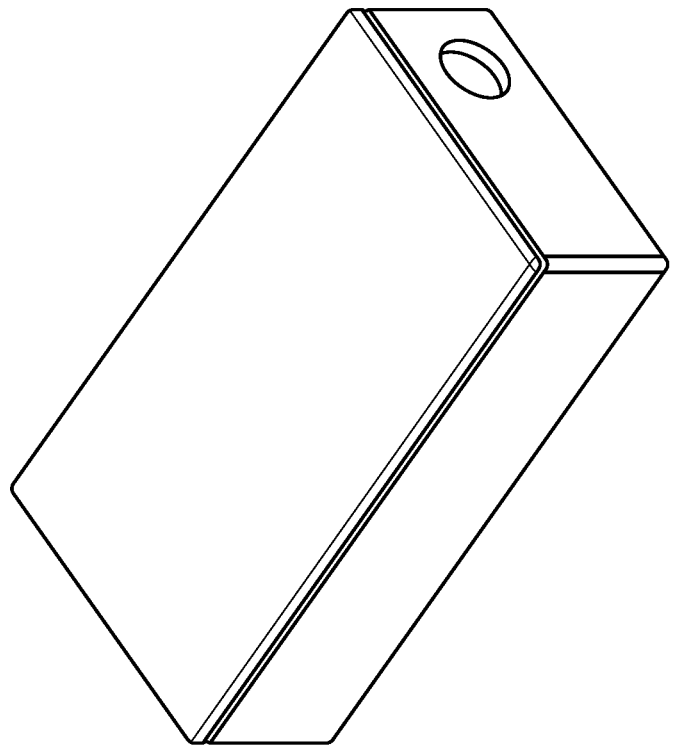
Figure 15D:
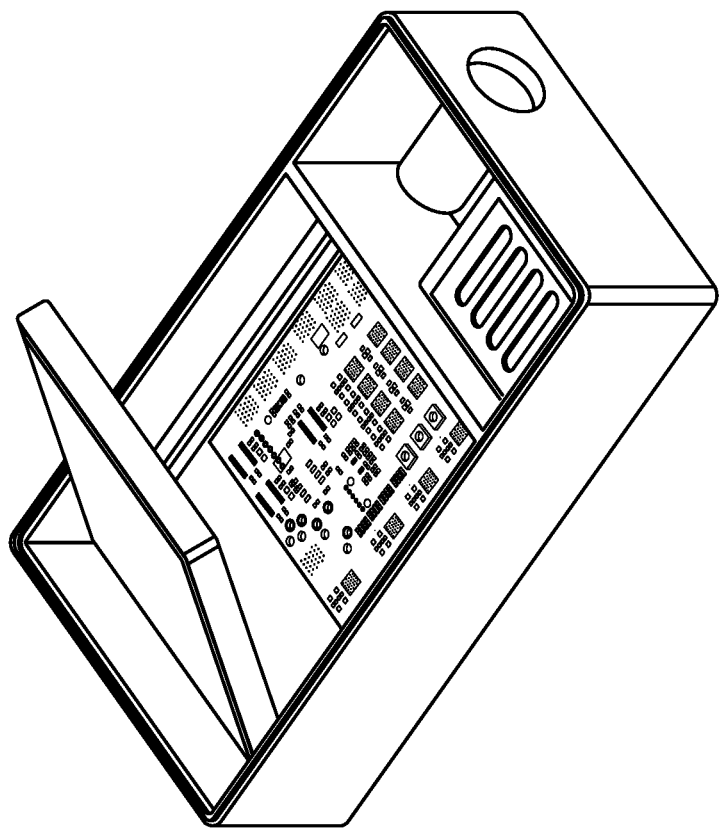
Figure 15C:
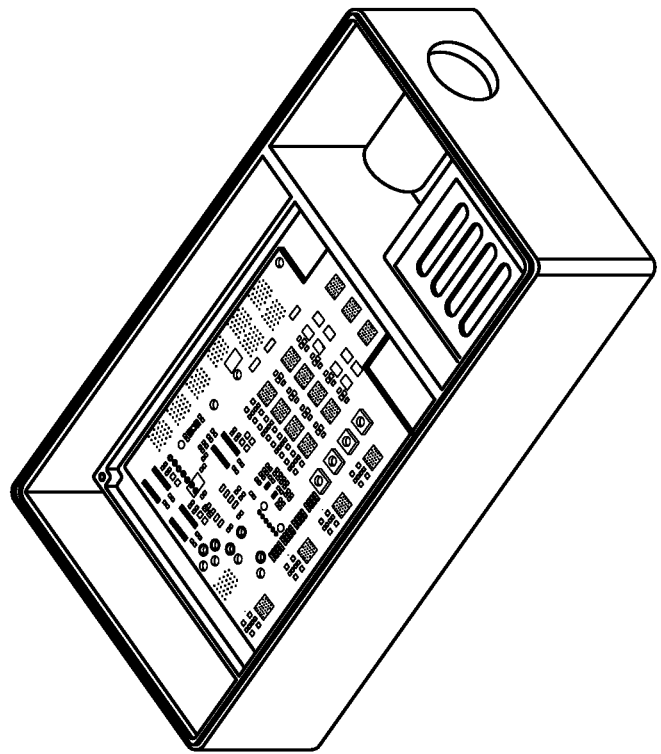
Figure 15F:
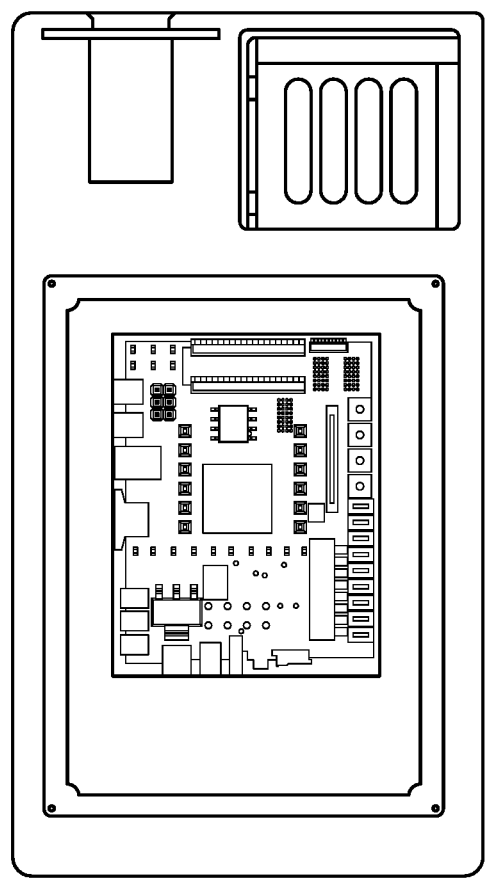
Figure 15E:
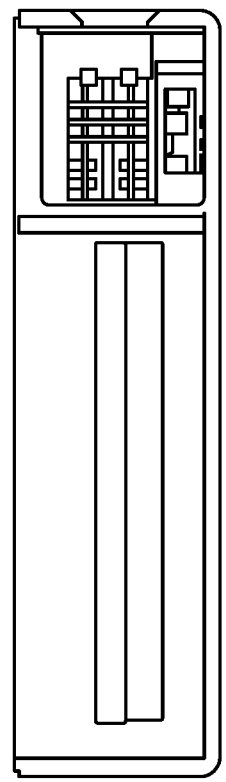

FIGS. 15A-15F depict different views of an example portable iNQR system (e.g., corresponding to any of the systems shown in FIGS. 10-12). For example, FIG. 15A, depicts the system including complete shielding with a provision for including an external pre-polarization setup. FIG. 15B depicts the system if the lid is removed, showing access to the SoC. FIG. 15C depicts the system if the Del-SoC and its base (lid for the inner Faraday cage) are removed, such that the analog front-end (low-noise preamplifier, low pass filter, duplexer) are accessible. FIG. 15D depicts the system if the analog front-end is removed, such that the broadband matching network can be accessed by moving the base of the analog front-end as a hinge. FIG. 15E depicts a side view of the iNQR system. FIG. 15F depicts a top view of the iNQR setup.

The set of the iNQR system of FIGS. 15A-15F may be designed to ensure that the measurement SNR is high enough to draw statistically valid conclusions of objects based on measurements and analysis performed by the system. In addition to intrinsic noise sources (e.g., thermal noise in the detector), NQR is also susceptible to interference from external RF sources (e.g., AM radio stations) and environmental perturbations (e.g., temperature fluctuations). As the setup consists of various elements like capacitors, coil, and power supplies, and is also surrounded by many other electronic devices, there can be a variety of such environmental sources that affect the measurements, i.e., create external interference that degrades SNR. A second detector (i.e., coil) can be added to the iNQR system if desired to reduce such unwanted interference. This second detector would be unshielded and not contain any sample. Thus, its output is dominated by external interference that is at least partially-correlated with that in the main sample coil, which allows these unwanted terms to be removed by using a variety of active noise cancellation (ANC) algorithms (LMS, filtered-X LMS, etc.).

Additionally, the positioning and shielding of the PCBs, SoC board, coil, power supply, and the enclosure thus affect the SNR. The analog front-end is designed to minimize the noise added by its own components, while external RF noise is effectively by using i) a Faraday cage as an RF shield, and ii) an optional second detector and ANC algorithm. As shown in FIGS. 15A-15F, each mode consists of four layers, and each layer is designed to provide maximum shielding from environmental RF noise while also keeping the setup portable.

In view of the foregoing, the various systems and devices disclosed herein may be designed to include one or more of the following features:

- The iNQR system is provided in small (hand-held) form-factor.
- The iNQR system is designed to be autonomous (does not need any external computer or other processor), and is portable, and battery-powered, which is also a first for NQR-based chemical analyzers.
- The iNQR system includes an automatically-tunable broadband matching network that allows the user to select a frequency of choice automatically.
- The iNQR system uses a novel time-efficient "jump frequency sweep" pulse sequence in order to rapidly search a large region of frequency space for unknown NQR resonances. In this way, the system can quickly detect unknown NQR frequencies present within the frequency sweep range.
- The analog front-end of the iNQR system is optimized to improve the signal-to-noise ratio (SNR) of the measurement. Major optimizations include use of a digitally-tunable low-noise preamplifier, built-in single-port network analyzer for closed-loop tuning, use of passively-filtered DC power supplies, and assembly within a Faraday shield.
- The iNQR system integrates, for the first time, the following components within a single enclosure: a high-quality-factor (high-Q) coil, a broadband tunable matching network, an optimized analog front-end, power management circuitry, and a digital back-end implemented on a low-cost system-on-chip (SoC) development board. As a result, the entire system is autonomous and portable.
- The iNQR system uses a custom-designed enclosure for shielding: this uses two aluminum enclosures and base plates to keep environmental RF interference to the minimum.
- The sample coil design (including size, shape, wire size, and winding pattern) may be optimized to get the maximum possible SNR while receiving NQR signals from a sample with a given volume.
- The iNQR system can also integrate a custom sample pre-polarization system based either on i) mechanical motion of the sample or magnet, or ii) change in current within an electromagnet, to significantly improve the SNR obtained per unit time for a given sample volume.

The proposed portable iNQR system disclosed herein will help in the authentication of food and dietary supplements through the supply chain. It allows samples with unknown active ingredients to be tested in the field over a range of frequencies to find suitable NQR resonances, which then serve as unique chemical fingerprints, intrinsic signatures, or watermarks for verifying identity. In the case of samples with known active ingredients, the iNQR system allows rapid and chemically specific quantification of the active ingredient based on its existing manufacturer-specific watermark, which in practice consists of three main parameters per NQR resonance: amplitude, decay time, and linewidth. This signature is then tested with an existing machine learning (ML) algorithm, such a support vector machine (SVM) classifier that traces the unknown sample to its manufacturer.

FIGS. 16A-16F show examples of some types of measurements that may be made by the iNQR system disclosed herein. For example, signal parameters (e.g., A: amplitude, $\Delta f$: line width, and $T_{2,eff}$: effective decay time) are extracted from measurements, such as shown in FIG. 16A. The statistics of the signal parameters are analyzed to evaluate measurement uncertainty. As an example, the evaluation process starts by (i) weighting the measured signals (echoes) by their expected amplitudes (using an initial estimate of $T_{2,eff}$), (ii) matched filtering, and (iii) fitting to an exponential decay function to get the values of A and $T_{2,eff}$ as shown in FIG. 16D. Note that the value of $T_{2,eff}$ can range from several milliseconds to seconds depending on the sample and that samples with longer values of $T_{2,eff}$ require longer measurement times. While the proposed approach shows a good stability of analysis across multiple measurements, which may be achieved by implementing proper device design and calibration procedures.

In further view of the foregoing structural and functional description, those skilled in the art will appreciate that portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a,", "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method comprising:
    analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and
    determining a tag signature for the solid object based on the feature data determined for each of the locations,
    wherein prior to analyzing, the method further comprises applying a respective chemical tag or changing a respective mechanical property at each of the locations of the solid object.

2. The method of claim 1, wherein the chemical tag is embedded within a substrate material adjacent to the surface of the solid object.

3. The method of claim 2, wherein the solid object is a container or packaging material that contains a quantity of another material.

4. The method of claim 2,
    wherein the chemical tag includes different concentrations of the one or more chemical elements applied to different spatial locations on the solid object, and/or
    wherein the chemical tag includes a deterministic concentration of a given chemical element for each of the different spatial locations, a value of the feature data for each of the spatial locations being proportional to the concentration of the given chemical element at each respective location.

5. The method of claim 4, wherein the concentration of the given chemical element is different for at least some of the different spatial locations.

6. A method comprising:
    analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and
    determining a tag signature for the solid object based on the feature data determined for each of the locations,
    wherein the feature data includes spectroscopic feature data representing at least one of spectrum amplitude, decay time and linewidth.

7. A method comprising:
    analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and
    determining a tag signature for the solid object based on the feature data determined for each of the locations,
    wherein the one or more analysis technologies includes one or more of magnetic resonance (MR) spectrometry, near infrared (NIR) spectrometry, nuclear quadrupole resonance (NQR) spectrometry and ultrasound.

8. The method of claim 7, wherein the tag signature comprises a set of values, each of the values being determined based on the feature data for a respective one of the locations.

9. The method of claim 7,
    wherein the analyzing is performed by a device that includes electronics within a common portable housing, and
    using a computing device that is programmed to generate the signature that is within the common portable housing or connected to the housing via an interface.

10. A method comprising:
    analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and
    determining a tag signature for the solid object based on the feature data determined for each of the locations,
    wherein the chemical property includes a composition or concentration of one or more chemical elements of the solid object at least one of the respective locations.

11. A method comprising:
    analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and
determining a tag signature for the solid object based on the feature data determined for each of the locations, wherein the mechanical property includes mesoscopic texture of the solid object of the solid object at least one of the respective locations.

12. A method comprising:
    analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and determining a tag signature for the solid object based on the feature data determined for each of the locations, wherein the analyzing further comprises:

applying an electric field gradient at a selected resonance frequency to determine the spectroscopic feature data for one of the locations.

13. The method of claim 12, wherein the selected resonance frequency is set to a respective range of frequencies for each of the respective locations.

14. A method comprising:

analyzing separately a number of locations distributed across a surface of a solid object according to one or more analysis technologies to determine feature data for each of the locations, the feature data being indicative of a respective chemical property or mechanical property of the solid object at each of the locations, corresponding to a feature tag, and the feature data depending on the one or more analysis technologies; and determining a tag signature for the solid object based on the feature data determined for each of the locations, wherein the tag signature is stored in a data repository, the method further comprising an authentication method that includes:

selecting which of the one or more analysis technologies to utilize at each of the respective locations;

analyzing the number of locations distributed across a given surface of the solid object according to the selected one or more analysis technologies to determine corresponding feature data for each of the locations;

generating an evaluation signature based on the corresponding feature data; and comparing the evaluation signature with the stored tag signature to authenticate the solid object if the evaluation signature matches the stored tag signature or to identify the solid object as counterfeit if the evaluation signature fails to match the stored tag signature for the solid object.

15. A system to authenticate an object, comprising:

a measurement subsystem to measure features from a number of spatial locations distributed across a surface of a solid object and to generate corresponding feature data representing the measured features for each of the respective spatial locations, the feature data for each respective spatial location depending on respective chemical or mechanical properties at each of the respective spatial locations;

one or more non-transitory machine-readable media to store the feature data and machine-readable instructions executable by a processor to perform a method comprising:

determining a signature for the object based on the feature data determined for at least some of the spatial locations; and storing the signature for the object, wherein the signature is stored as object data in a data repository, the object data including the signature for the solid object and information identifying the solid object.

16. A system to authenticate an object, comprising:

a measurement subsystem to measure features from a number of spatial locations distributed across a surface of a solid object and to generate corresponding feature data representing the measured features for each of the respective spatial locations, the feature data for each respective spatial location depending on respective chemical or mechanical properties at each of the respective spatial locations;

one or more non-transitory machine-readable media to store the feature data and machine-readable instructions executable by a processor to perform a method comprising:

determining a signature for the object based on the feature data determined for at least some of the spatial locations; and storing the signature for the object, wherein different concentrations of the one or more chemical elements are applied to at least two different spatial locations of the solid object.

17. A system to authenticate an object, comprising:

a measurement subsystem to measure features from a number of spatial locations distributed across a surface of a solid object and to generate corresponding feature data representing the measured features for each of the respective spatial locations, the feature data for each respective spatial location depending on respective chemical or mechanical properties at each of the respective spatial locations;

one or more non-transitory machine-readable media to store the feature data and machine-readable instructions executable by a processor to perform a method comprising:

determining a signature for the object based on the feature data determined for at least some of the spatial locations; and storing the signature for the object, wherein a deterministic concentration of a given chemical element is applied for each of the respective spatial locations, a value of the feature data for each of the spatial locations being proportional to the concentration of the given chemical element at each respective spatial location, or wherein the concentration of the given chemical element is different for at least some of the respective spatial locations.

18. A system to authenticate an object, comprising:

a measurement subsystem to measure features from a number of spatial locations distributed across a surface of a solid object and to generate corresponding feature data representing the measured features for each of the respective spatial locations, the feature data for each respective spatial location depending on respective chemical or mechanical properties at each of the respective spatial locations;

one or more non-transitory machine-readable media to store the feature data and machine-readable instructions executable by a processor to perform a method comprising:

determining a signature for the object based on the feature data determined for at least some of the spatial locations; and storing the signature for the object, wherein the feature data for each of the locations is spectroscopic feature data that includes at least one of spectrum amplitude, decay time and linewidth.

19. A system to authenticate an object, comprising:

a measurement subsystem to measure features from a number of spatial locations distributed across a surface of a solid object and to generate corresponding feature data representing the measured features for each of the respective spatial locations, the feature data for each respective spatial location depending on respective chemical or mechanical properties at each of the respective spatial locations;
one or more non-transitory machine-readable media to store the feature data and machine-readable instructions executable by a processor to perform a method comprising:
determining a signature for the object based on the feature data determined for at least some of the spatial locations; and
storing the signature for the object,
wherein the measurement subsystem is configured to implement one or more of magnetic resonance (MR) spectrometry, near infrared (NIR) spectrometry, nuclear quadrupole resonance (NQR) spectrometry and ultrasound.

20. A system to authenticate an object, comprising:
a measurement subsystem to measure features from a number of spatial locations distributed across a surface of a solid object and to generate corresponding feature data representing the measured features for each of the respective spatial locations, the feature data for each respective spatial location depending on respective chemical or mechanical properties at each of the respective spatial locations;
one or more non-transitory machine-readable media to store the feature data and machine-readable instructions executable by a processor to perform a method comprising:
determining a signature for the object based on the feature data determined for at least some of the spatial locations; and
storing the signature for the object,
wherein the analyzing further comprises:
applying a magnetic field gradient at a selected resonance frequency to determine the spectroscopic feature data for one of the locations,
wherein the selected resonance frequency is set to a respective range of frequencies selected for each of the respective locations.

21. A system to authenticate an object, comprising:
a measurement subsystem to measure features from a number of spatial locations distributed across a surface of a solid object and to generate corresponding feature data representing the measured features for each of the respective spatial locations, the feature data for each respective spatial location depending on respective chemical and/or mechanical properties at each of the respective spatial locations;
one or more non-transitory machine-readable media to store the feature data and machine-readable instructions executable by a processor to perform a method comprising:
determining a signature for the object based on the feature data determined for at least some of the spatial locations; and
storing the signature for the object,
wherein the signature is stored as a stored tag signature in a data repository, the instructions further comprising an authentication method that includes:
analyzing the respective spatial locations across a given surface of the solid object according to one or more analysis technologies to determine the corresponding feature data for each of the locations;
generating an evaluation signature based on the corresponding feature data for at least some of the locations; and
comparing the evaluation signature with the stored tag signature to authenticate the solid object if the evaluation signature matches the stored tag signature or to identify the solid object as counterfeit if the evaluation signature fails to match the stored tag signature for the solid object.

* * * * *